(12) United States Patent
Alex et al.

(10) Patent No.: US 10,863,387 B2
(45) Date of Patent: Dec. 8, 2020

(54) SYSTEM AND METHOD FOR ORCHESTRATING POLICY IN A MOBILE ENVIRONMENT

(71) Applicant: CISCO TECHNOLOGY, INC., San Jose, CA (US)

(72) Inventors: Arun C. Alex, Nashua, NH (US); Gibson Soon Teck Ang, Westford, MA (US); Kevin D. Shatzkamer, Hingham, MA (US); Ramanathan Jagadeesan, Saratoga, CA (US); Fred Chen, Westborough, MA (US); Rajesh P. Velandy, Nashua, NH (US); Wenxing Zheng, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 14/044,390

(22) Filed: Oct. 2, 2013

(65) Prior Publication Data

US 2015/0289167 A1   Oct. 8, 2015

(51) Int. Cl.
*H04W 28/24* (2009.01)
*H04L 12/24* (2006.01)
*H04W 88/16* (2009.01)

(52) U.S. Cl.
CPC ......... *H04W 28/24* (2013.01); *H04L 41/0893* (2013.01); *H04L 41/5025* (2013.01); *H04W 88/16* (2013.01)

(58) Field of Classification Search
None
See application file for complete search history.

(56) References Cited

U.S. PATENT DOCUMENTS

| 6,128,279 | A | 10/2000 | O'Neil et al. |
| 8,249,361 | B1 | 8/2012 | Steffens |
| 9,270,709 | B2 * | 2/2016 | Shatzkamer ........ H04L 65/1069 |
| 9,414,215 | B2 | 8/2016 | Shatzkamer et al. |

(Continued)

FOREIGN PATENT DOCUMENTS

| CN | 104053142 A | 9/2014 |
| CN | 104284324 A | 1/2015 |

(Continued)

OTHER PUBLICATIONS

USPTO Jun. 9, 2015 Non-Final Office Action from U.S. Appl. No. 13/750,835.

(Continued)

*Primary Examiner* — Christopher T Wyllie
(74) *Attorney, Agent, or Firm* — Patterson + Sheridan, LLP

(57) ABSTRACT

A method is provided in one example and includes receiving at least one first input indicating at least one network condition associated with a first user device having a user associated therewith. The first user device has a first bearer channel established between the first user device and a gateway, and the first bearer channel has a first quality of service level. The method further includes determining whether to modify the first user device to a second quality of service level based upon the received at least one first input, and sending a first request to a first network element instructing the first network element to modify the first user device to the second quality of service level.

24 Claims, 17 Drawing Sheets

(56) References Cited

U.S. PATENT DOCUMENTS

| | | |
|---|---|---|
| 9,558,043 B2 | 1/2017 | Alex et al. |
| 2003/0014518 A1 | 1/2003 | Bruno |
| 2003/0236087 A1 | 12/2003 | Stenton |
| 2004/0001498 A1 | 1/2004 | Chen et al. |
| 2004/0156495 A1 | 8/2004 | Chava |
| 2004/0172559 A1 | 9/2004 | Luo |
| 2004/0193582 A1 | 9/2004 | Smyth |
| 2004/0205767 A1 | 10/2004 | Partanen |
| 2004/0221038 A1 | 11/2004 | Clarke et al. |
| 2005/0228878 A1* | 10/2005 | Anstey ............... H04L 43/16 709/224 |
| 2006/0002333 A1* | 1/2006 | Skog ................. H04L 47/824 370/328 |
| 2006/0239275 A1* | 10/2006 | Zlateff ............ H04L 29/12047 370/400 |
| 2006/0246900 A1* | 11/2006 | Zheng ................ H04L 67/322 455/435.3 |
| 2007/0036145 A1 | 2/2007 | Riley et al. |
| 2007/0053308 A1* | 3/2007 | DuMas ................ H04L 45/00 370/254 |
| 2007/0165630 A1* | 7/2007 | Rasanen ............... H04L 47/14 370/389 |
| 2007/0250630 A1 | 10/2007 | Blanding et al. |
| 2008/0212509 A1* | 9/2008 | Kim ................... H04W 72/005 370/312 |
| 2008/0222646 A1 | 9/2008 | Sigal et al. |
| 2009/0248680 A1 | 10/2009 | Kalavade |
| 2010/0027663 A1 | 2/2010 | Dai |
| 2010/0036956 A1 | 2/2010 | Nishikawa |
| 2010/0153454 A1 | 6/2010 | Rehm et al. |
| 2010/0154059 A1* | 6/2010 | McNamee ......... H04L 63/1408 726/23 |
| 2010/0205436 A1 | 8/2010 | Pezeshki |
| 2011/0158090 A1 | 6/2011 | Riley et al. |
| 2011/0199903 A1* | 8/2011 | Cuervo ................ H04M 15/00 370/235 |
| 2011/0258246 A1 | 10/2011 | Khandekar et al. |
| 2011/0302414 A1 | 12/2011 | Logan |
| 2012/0052866 A1 | 3/2012 | Froehlich et al. |
| 2012/0054755 A1 | 3/2012 | Evans |
| 2012/0099429 A1* | 4/2012 | Ludwig ............... H04W 28/24 370/235 |
| 2012/0110145 A1 | 5/2012 | Pinheiro |
| 2012/0110462 A1 | 5/2012 | Eswaran et al. |
| 2012/0155389 A1 | 6/2012 | McNamee |
| 2012/0176953 A1* | 7/2012 | Chao ................. H04L 65/4076 370/312 |
| 2012/0182940 A1* | 7/2012 | Taleb ................ H04L 61/1511 370/328 |
| 2012/0239792 A1 | 9/2012 | Banerjee et al. |
| 2012/0265898 A1* | 10/2012 | Kruglick .............. H04W 4/18 709/235 |
| 2012/0281540 A1 | 11/2012 | Khan |
| 2012/0284189 A1* | 11/2012 | Gardella ............ H04L 12/1403 705/44 |
| 2012/0303425 A1 | 11/2012 | Katzin et al. |
| 2013/0013671 A1* | 1/2013 | Relan ................... G06F 9/452 709/203 |
| 2013/0035060 A1 | 2/2013 | Chan |
| 2013/0117092 A1* | 5/2013 | Cai ................... H04M 15/8016 705/14.31 |
| 2013/0176975 A1* | 7/2013 | Turanyi .............. H04W 72/087 370/329 |
| 2013/0183995 A1* | 7/2013 | Smith ................. H04W 16/14 455/452.2 |
| 2013/0189982 A1 | 7/2013 | Baluja |
| 2013/0295921 A1 | 11/2013 | Bhargava |
| 2014/0066084 A1* | 3/2014 | Paladugu ............ H04W 72/087 455/452.2 |
| 2014/0067728 A1 | 3/2014 | Ogren |
| 2014/0113628 A1 | 4/2014 | Sundararajan |
| 2014/0171135 A1 | 6/2014 | Fan |
| 2014/0201381 A1 | 7/2014 | Shimizu |
| 2014/0204746 A1 | 7/2014 | Sun et al. |
| 2014/0323084 A1 | 10/2014 | Menezes |
| 2014/0342691 A1 | 11/2014 | Kalavade |
| 2014/0370847 A1 | 12/2014 | Neal |
| 2015/0006733 A1 | 1/2015 | Khan et al. |
| 2015/0278296 A1 | 10/2015 | Alex et al. |
| 2015/0289123 A1 | 10/2015 | Shatzkamer et al. |
| 2015/0289167 A1* | 10/2015 | Alex .................. H04L 41/0893 370/329 |
| 2015/0312152 A1 | 10/2015 | Kerr |
| 2015/0373554 A1 | 12/2015 | Freda |
| 2016/0044512 A1 | 2/2016 | Potkonjak |

FOREIGN PATENT DOCUMENTS

| | | |
|---|---|---|
| EP | 2299647 A2 | 3/2011 |
| EP | 2299675 A1 | 3/2011 |
| EP | 2768181 | 8/2014 |
| EP | 2822247 | 1/2015 |
| EP | 2858016 | 4/2015 |
| EP | 2858020 | 4/2015 |
| EP | 2858303 | 4/2015 |
| WO | WO2012/000161 | 1/2012 |
| WO | WO2013/007287 | 1/2013 |

OTHER PUBLICATIONS

USPTO Jun. 4, 2015 Non-Final Office Action from U.S. Appl. No. 13/935,994.

USPTO Jun. 4, 2015 Non-Final Office Action from U.S. Appl. No. 14/046,684.

USPTO Jun. 23, 2015 Non-Final Office Action from U.S. Appl. No. 14/044,390.

PRC Jan. 13, 2017 SIPO First Office Action from Chinese Application Serial No. 201410096162.X.

PRC Jan. 25, 2017 SIPO First Office Action from Chinese Application Serial No. 201410035690.4.

USPTO Oct. 2, 2015 Non-Final Office Action from U.S. Appl. No. 13/750,835.

USPTO Oct. 30, 2015 Notice of Allowance from U.S. Appl. No. 13/935,994.

USPTO Nov. 13, 2015 Non-Final Office Action from U.S. Appl. No. 14/046,684.

USPTO Oct. 19, 2015 Final Office Action from U.S. Appl. No. 14/044,390.

Fajardo, V., et al., "Diameter Base Protocol," RFC 6733, Internet Engineering Task Force; Oct. 2012; 140 pages.

U.S. Appl. No. 14/046,684, filed Oct. 4, 2013 entitled "System and Method for Orchestrating Mobile Data Networks in a Machine-to-Machine Environment," Inventors: Kevin D. Shatzkamer, et al.

U.S. Appl. No. 14/044,433, filed Oct. 2, 2013 entitled "System and Method for Organizing Received Data and Associated Metadata in a Mobile Environment," Inventors: Arun C. Alex, et al.

U.S. Appl. No. 13/750,835, filed Jan. 25, 2013 entitled "System and Method for Abstracting and Orchestrating Mobile Data Networks in a Network Environment," Inventors: Arun C. Alex, et al.

U.S. Appl. No. 13/841,165, filed Mar. 15, 2013 entitled "Orchestrating Mobile Data Networks in a Network Environment," Inventors: Gibson Soon Teck Ang, et al.

U.S. Appl. No. 13/935,994, filed Jul. 5, 2013 entitled "Integrated Signaling Between Mobile Data Networks and Enterprise Networks," Inventors: Kevin D. Shatzkamer, et al.

Cisco Systems, Inc., "Cisco Policy and Charging Control Solution with Cisco Intelligent Policy Control Function," At-A-Glance, May 2011, 2 pages; http://www.cisco.com/en/US/solutions/collateral/ns341/ns973/at_a_glance_c45-665213.pdf.

Cisco Systems, Inc., "Cisco Policy and Charging Control for Mobile Operators: Efficiently Deploy, Scale, and Manage Services," Solution Overview, May 2011, 5 pages; http://www.cisco.com/en/US/solutions/collateral/ns341/ns973/ns1081/ns1091/solution_overview_c22-609897.pdf.

Gabriel Brown, "Monetization Strategies for Mobile Operators" White Paper, Jul. 2010, 8 pages; http://www.cisco.com/en/US/solutions/collateral/ns341/ns973/Cisco-Mobile-Monetization-WP.pdf.

(56) References Cited

OTHER PUBLICATIONS

Wikipedia, the free encyclopedia, "Policy charging and rules function," [retrieved and printed from the Internet Jan. 25, 2013, 2 pages; http://en.wikipedia.org/wiki/Policy_charging_and_rules_function.
USPTO Apr. 20, 2016 Final Office Action from U.S. Appl. No. 13/750,835.
USPTO Apr. 15, 2016 Notice of Allowance from U.S. Appl. No. 14/044,390.
USPTO Feb. 19, 2016 Non-Final Office Action from U.S. Appl. No. 14/044,390.
USPTO Dec. 12, 2014 Non-Final Office Action from U.S. Appl. No. 13/750,835.
EPO—Sep. 29, 2014 Extended Search Report and Opinion from European Application Serial No. 14166461.5.
EPO Jul. 21, 2014 Extended Search Report and Opinion from European Application Serial No. 14151385.
Kunz, Thomas, "The Influence of Different Workload Descriptions on a Heuristic Load Balancing Scheme," IEEE Transactions on Software Engineering, vol. 17, No. 7, Jul. 1991.
USPTO Jan. 14, 2016 Non-Final Office Action from U.S. Appl. No. 03919.0559.
USPTO Sep. 23, 2016 Notice of Allowance from U.S. Appl. No. 13/750,835.
USPTO Aug. 10, 2016 Final Office Action from U.S. Appl. No. 14/044,390.
USPTO Jul. 12, 2016 Final Rejection from U.S. Appl. No. 13/841,165.
EPO Feb. 12, 2015 Extended Search Report and Opinion from European Application Serial No. 1485787.
"GSM 03-08 Version 5.1.0: Digital Cellular Telecommunication System (Phase 2+) Organization of Subscriber Data," ETSI European Telecommunications Standard Institute, Sophia Antipolis, Valbonne France; Apr. 1997; 22 pages.
EPO Feb. 23, 2015 Extended Search Report and Opinion from European Application Serial No. 14183238.6.
China Mobile, et al., "Policy Control Based on Network Condition," SA WG2 Temporary Document TD S2-105228, 3GPP TSG SA WG2 Meeting #81, Oct. 11-15, 2010, Prague, Czech Republic, XP-002658059; 4 pages.
NTT Docomo, "C-Plane/PCC based Congestion Notification," SA WG2 Temporary Document S2-130872, SA WG2 Meeting #96, Apr. 8-12, 2013, San Diego, US; 5 pages.
Atis, "Network Optimization Focus Group (NetOp-FG) Assessment and Recommendations," Alliance for Telecommunications Industry Solutions, Sep. 2011; 61 pages.
EPO Jul. 25, 2016 Communication from European Application Serial No. 14185787.0; 5 pages.

\* cited by examiner

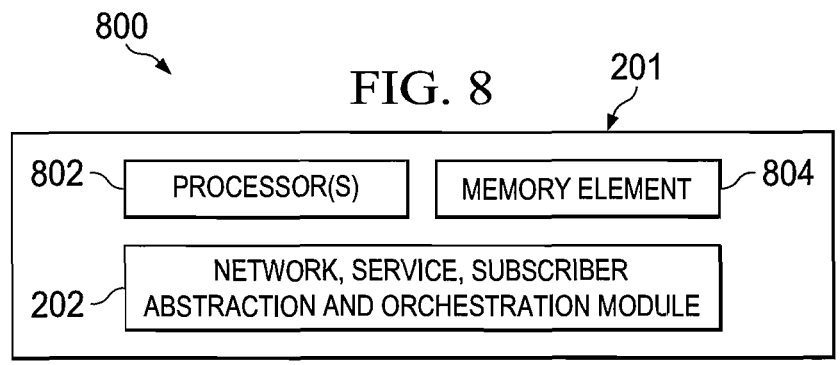
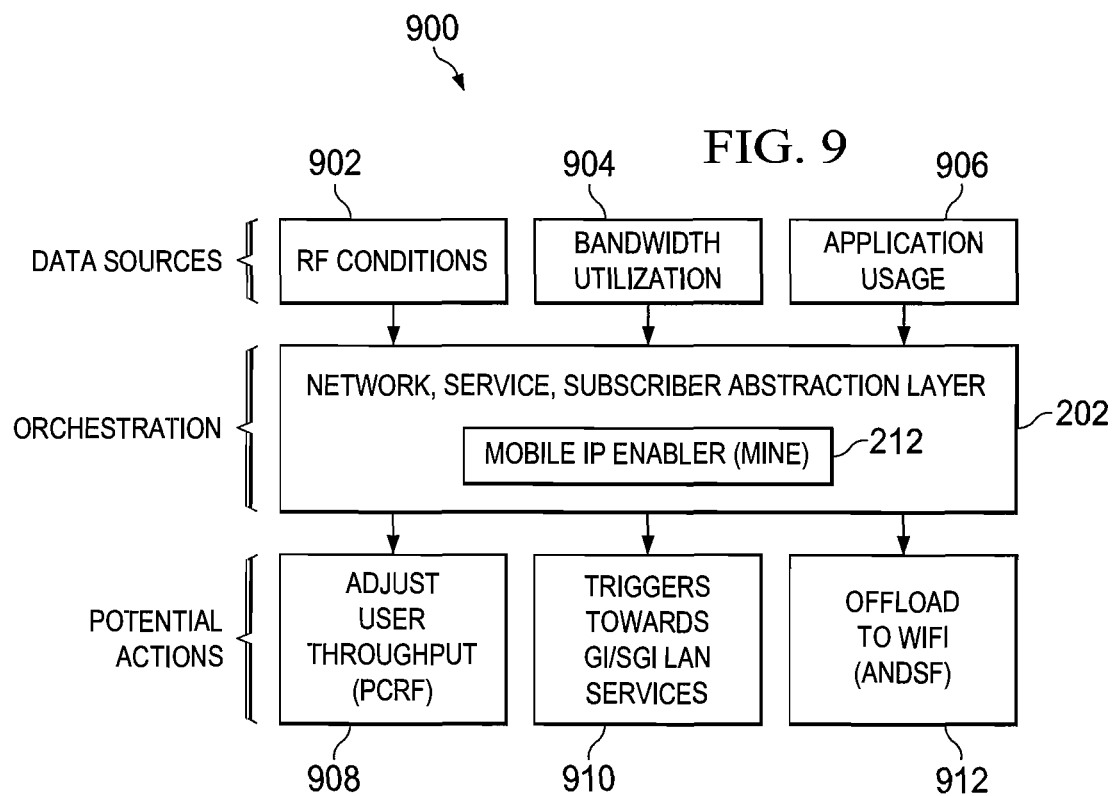

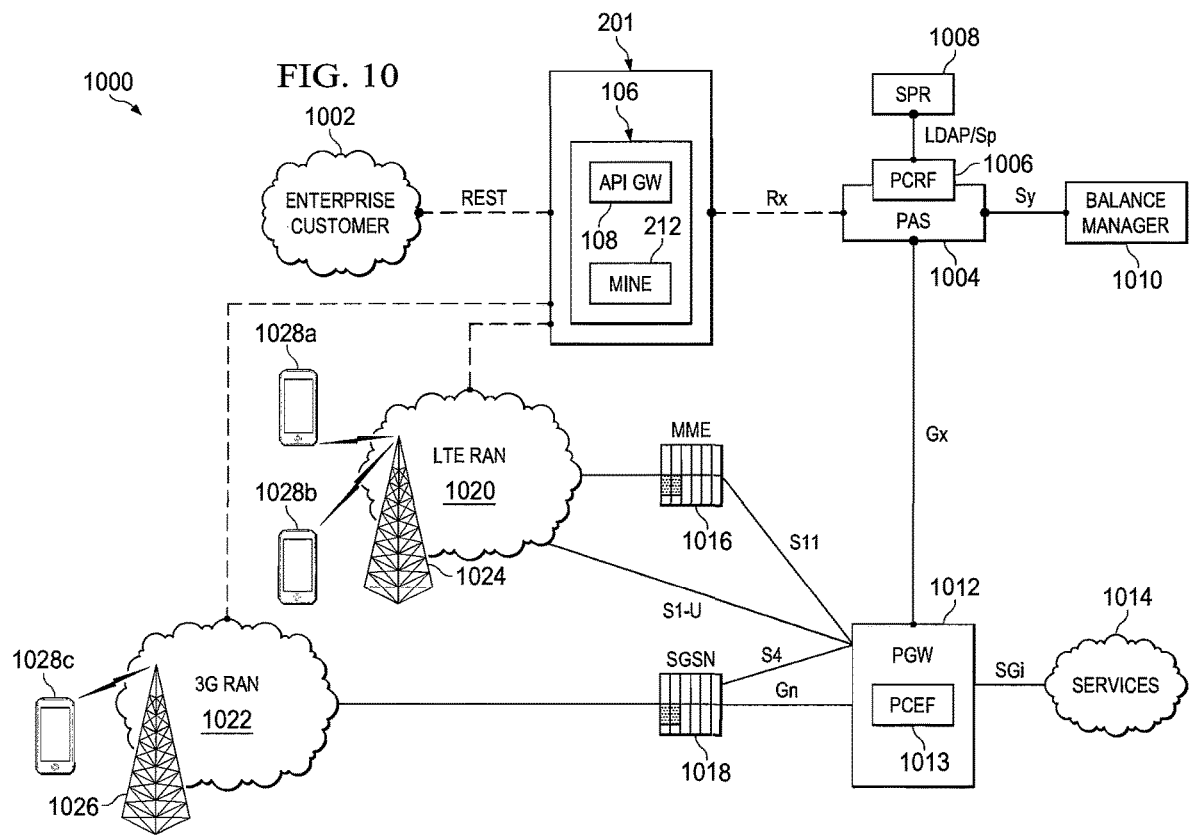

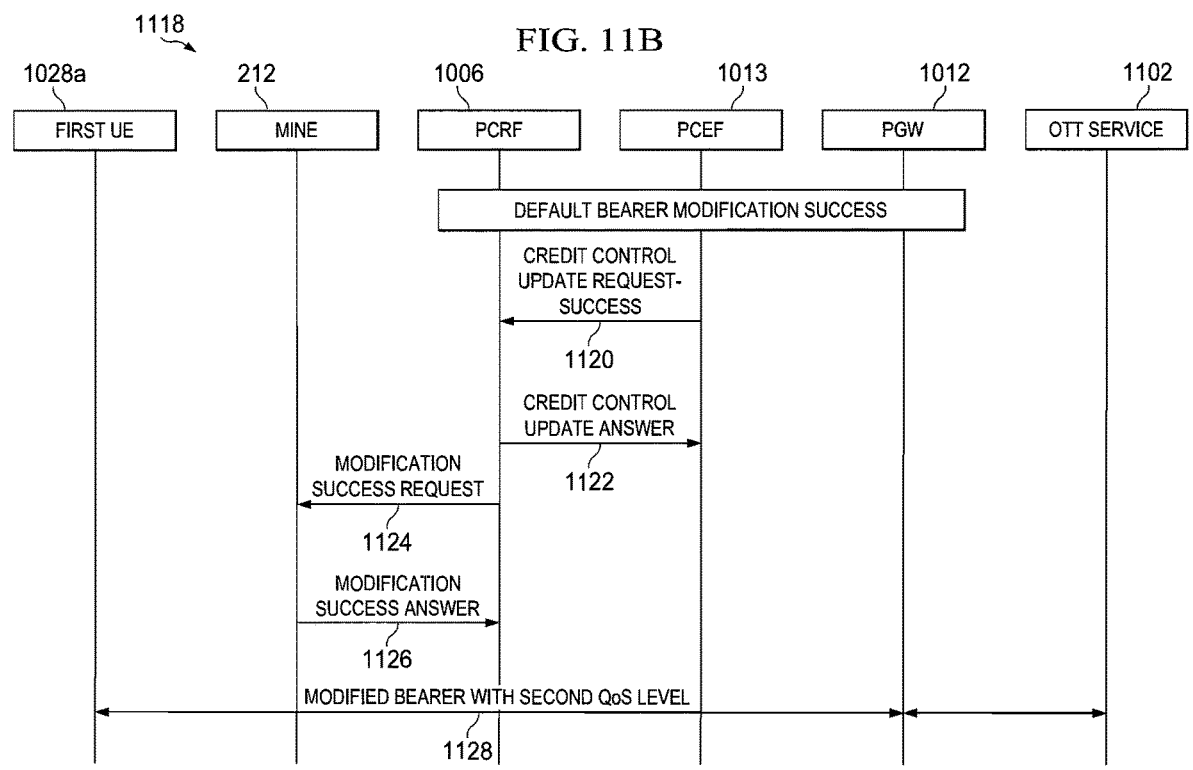

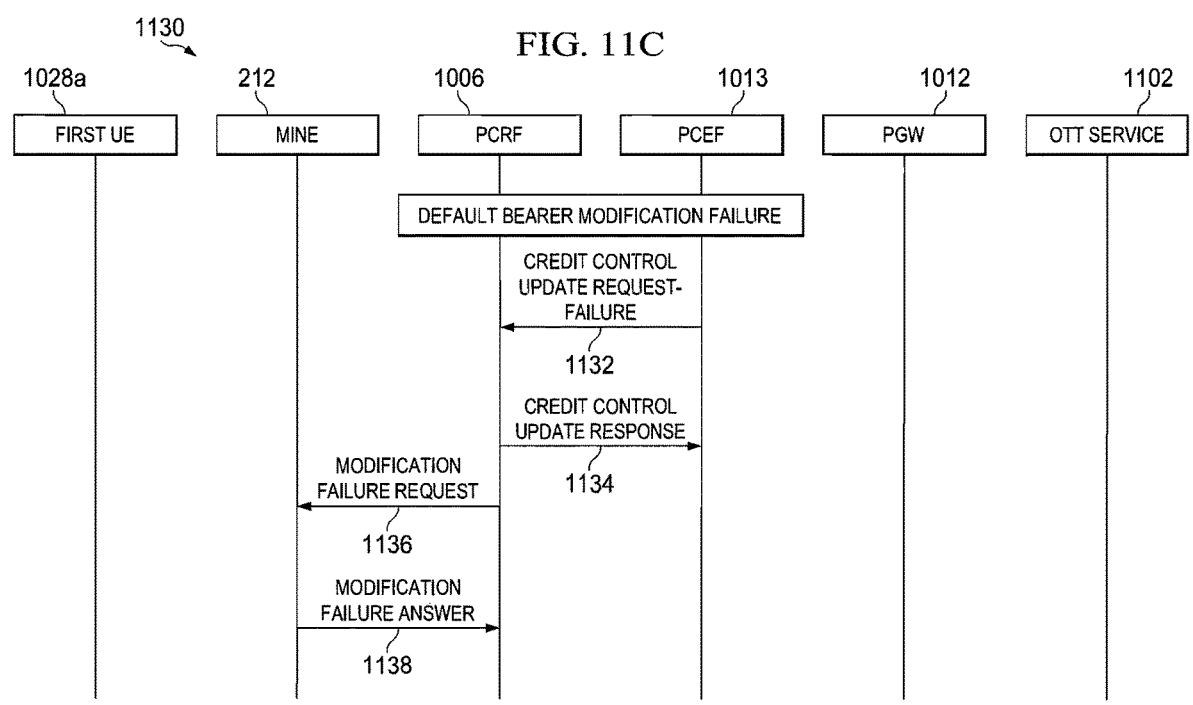

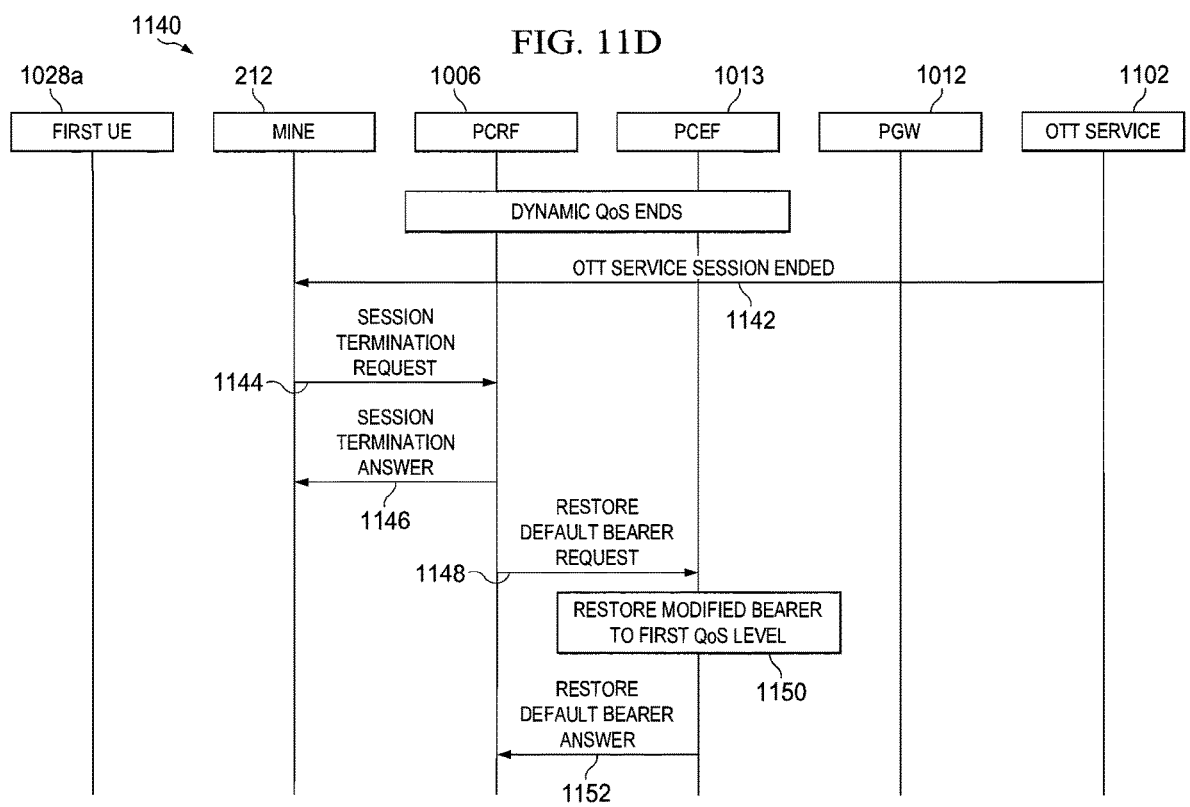

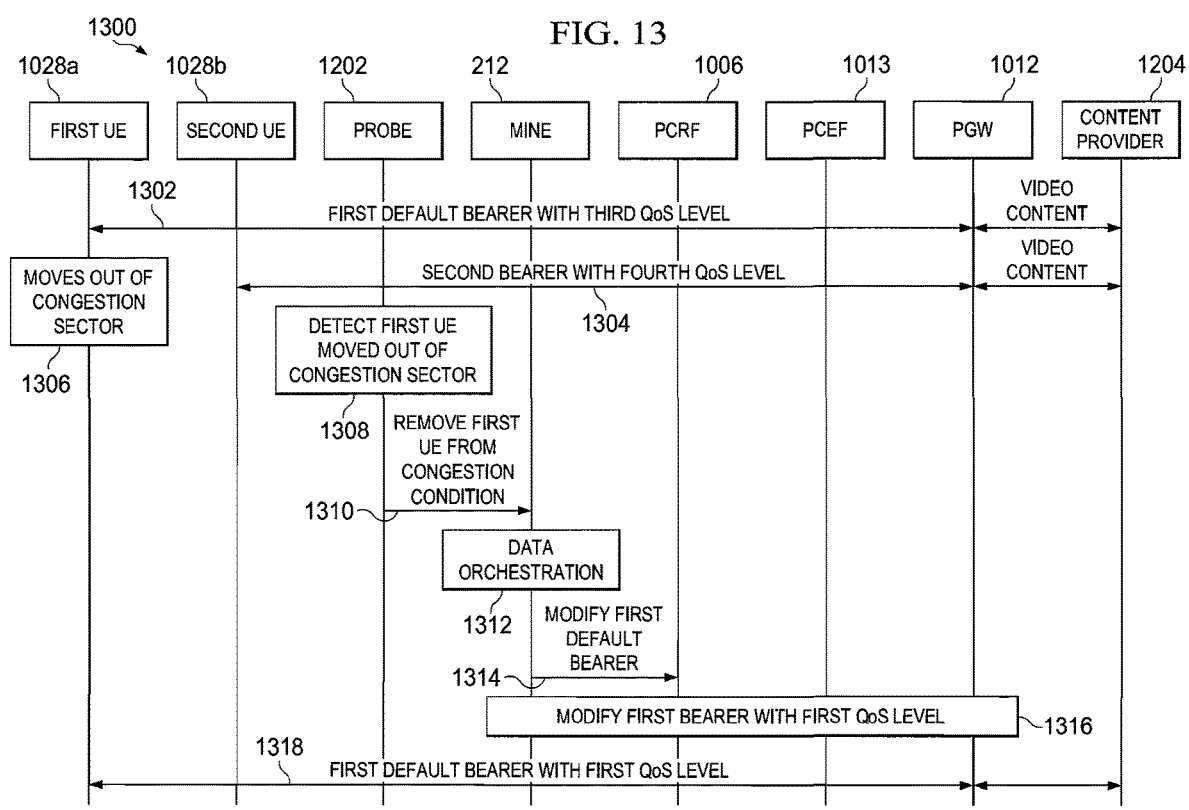

SYSTEM AND METHOD FOR ORCHESTRATING POLICY IN A MOBILE ENVIRONMENT

TECHNICAL FIELD

This disclosure relates in general to the field of communications and, more particularly, to providing a system and method for orchestrating policy in a mobile environment.

BACKGROUND

The phenomenal growth of mobile networking is presenting mobile operators with tremendous opportunities along with corresponding challenges as they race to add capacity and services to meet accelerating demands. Mobile operators worldwide are seeing tremendous growth in mobile data subscriptions and bandwidth usage. The emergence of free, "over-the-top" and offnet applications and services (such as those from Skype, gaming vendors, and applications stores is impacting the return on investment (ROI) of mobile operators. Consumers can utilize these applications and services, which use the operator's network, without providing even an incremental usage fee to the mobile operator. While operators benefit in the near term with new subscriptions, long term there are profitability challenges from the explosion of data traffic. To take advantage of the mobile Internet explosion, mobile operators must add value to third party service transactions. This value can be extracted in terms of new revenue and profit. Without this value add, mobile operators risk becoming simply a bandwidth "bit pipe" provider. As a result, it is critical for mobile operators to invest strategically in their network assets allowing them to launch new services and go beyond flat-rate data plans. In current networks, various pieces of information like location of a subscriber and the reachability of a subscriber etc distributed in various network elements throughout the network and there is no single entity in the network that can aggregate the information present in the different network elements, correlate the information, and feed that information to various external entities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a simplified block diagram illustrating a particular embodiment of a server of the communication system of FIG. 2;

FIG. 9 is a simplified conceptual diagram of an embodiment for orchestrating policy in a mobile environment;

FIG. 10 is a simplified block diagram of an embodiment of a communication system 1000 for orchestrating policy in a mobile environment;

FIGS. 11A-11D are simplified flow diagrams showing an embodiment of signaling for modifying a default bearer channel to provide dynamic quality of service (QoS) within the communication system of FIG. 10;

FIG. 13 is a simplified flow diagram showing another embodiment of signaling for venue throttling of a default bearer channel to provide dynamic quality of service (QoS) within the communication system of FIG. 10.

DETAILED DESCRIPTION OF EXAMPLE EMBODIMENTS

Overview

Figure 1:
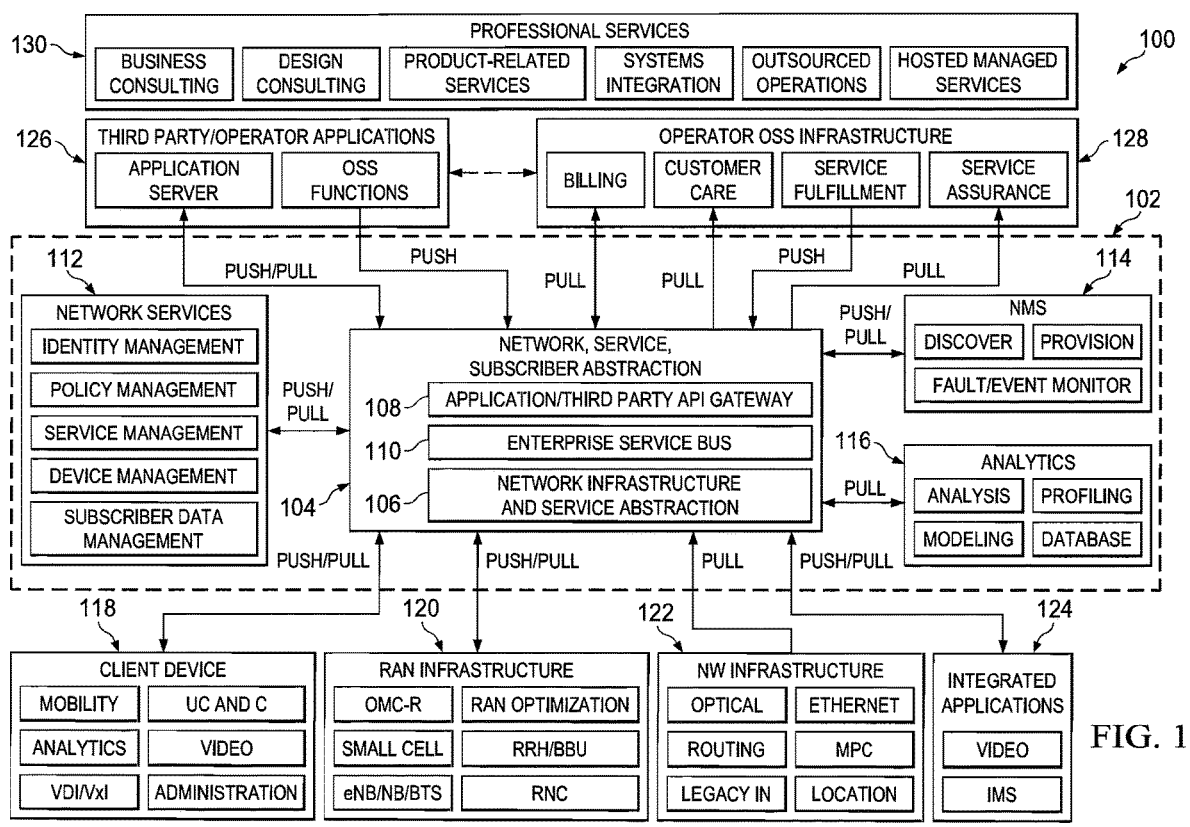
FIG. 1 is a simplified block diagram showing a high level architecture of a communication system for orchestrating mobile networks in accordance with one embodiment of the present disclosure.

A method is provided in one example and includes receiving at least one first input indicating at least one network condition associated with a first user device having a user associated therewith. The first user device has a first bearer channel established between the first user device and a gateway, and the first bearer channel has a first quality of service level. The method further includes determining whether to modify the first user device to a second quality of service level based upon the received at least one first input, and sending a first request to a first network element instructing the first network element to modify the first user device to the second quality of service level.

In a particular embodiment, determining whether to modify the first user device to the second quality of service level includes determining whether to modify the first quality of service level of the first bearer channel to the second quality of service level based upon the received at least one first input, and sending the first request to the first network element includes sending the first request to the first network element instructing the first network element to modify the first bearer channel to the second quality of service level.

In another particular embodiment, sending the first request to the first network element includes sending the first request to the first network element instructing the first network element to establish a second bearer channel between the first user device and the gateway, assign the second quality of service level to the second bearer channel, and move a flow associated with the first bearer channel to the second bearer channel.

In a particular embodiment, the first network element is configured to manage at least one policy associated with the user. In another particular embodiment, the first network element includes a policy and charging rules function (PCRF) configured to manage the at least one policy.

In another particular embodiment, the network condition includes a condition of a network in communication with the user device. In another particular embodiment, the network condition includes at least one of radio conditions of the network, bandwidth utilization of the first user device, and application usage of the first user device. In another particular embodiment, the network condition includes an indication of congestion of a network path between the first user device and a service or application. In still another particular embodiment, the network includes a radio access network.

In another particular embodiment, the first quality of service level is greater than the second quality of service level. In still another particular embodiment, the first quality of service level is less than the second quality of service level. In another particular embodiment, the method further includes receiving at least one second input indicating the at least one network condition associated with the first user device, determining whether to modify the second quality of service level of the first bearer channel to the first quality of service level based upon the received at least one second input, and sending a second request to the first network element instructing the first network element to modify the first bearer channel to the first quality of service level.

Example Embodiments

Referring now to FIG. 1, FIG. 1 is a simplified block diagram showing a high-level architecture of a communication system 100 for orchestrating mobile networks in accordance with one embodiment of the present disclosure. Communication system 100 includes a server 102 including a network, service, and subscriber abstraction module 104. The network, service, and subscriber abstraction module 104 includes a network infrastructure and service abstraction layer 106, an application/3rd party application programming interface (API) gateway 108, and enterprise service BUS 110. Server 102 further includes a network services layer 112, a network management system (NMS) 114, and analytics module 116.

Communication system 100 provides for monetization architecture for mobile networks. Issues facing service providers today includes creating services targeted for both the enterprise and consumer markets in a rapid fashion, dynamically optimizing the network to drive efficiencies, enabling a third party application developer eco-system to easily leverage the power of the network, and providing enforceability of service level agreements between the network and the application developer. One or more embodiments of the architecture described herein address these issues. Various embodiments allow a mobile service provider, fixed line provider and/or large enterprise to create a platform which exposes network capabilities and allows application developers and walled gardened applications developers to leverage the power of the network, allowing service providers to monetize the capabilities of the network by optimizing the infrastructure, creating a service framework that allows service providers to quickly and efficiently create new service offers, and defining a set of criteria, including Quality of Service, which may be monitored, enforced, and relied-upon. Various embodiments provide an architecture to integrate with the existing capabilities that the service provider provides while avoiding "rip and replace" scenarios and ensuring faster time to market.

Network services layer 112 provides for the management of network services within communication system 100. In a particular embodiment, network services layer 112 may provide one or more of identity management, service management, policy management, device management, and subscriber data management. Identity management enables a service provider to manage subscribers across all applications, device types, and access types. In a mobile context, the Identity management functions may reside within one or more of a home location register (HLR), home subscriber server (HSS), and authentication, authorization, and accounting (AAA) server. Service management enables a service provider to manage services/application charging/rating functions across all access types, device types, and subscribers. In mobile a mobile context, the service management functions may reside in one or more of an online charging system (OCS) and an offline charging system (OFCS). Device management enables a service provider to manage device behavior when interacting with different access and applications. In a mobile context, the device management functions may reside in a Open Mobile Alliance device management (OMA-DM) function and Access network discovery and selection function (ANDSF), but may in other embodiments also extend into operator-specific implementations that allow modification of device parameters, security parameters, application interaction, etc.

Policy management enables a service provider to define rules based on various input parameters from identity/service/device management functions, network functions, analytics functions, coupled with internally-defined rules (e.g., time-of-day, promotional), to determine how a specific service for a specific subscriber, on a specific device, at a specific instant (e.g., real-time), at a specific location (e.g., cell tower), when connected to a specific network is to be treated. In a mobile context, the policy management functions may reside live in a policy and charging rules function (PCRF). Subscriber data management enables a service provider to deliver real-time services that reflect individual preferences of subscriber. Subscriber data management may encompass the overarching service layer management workflow items and underlying an service layer management database that allow for multiple structured or unstructured pieces of information to be stored and aggregated into a holistic "user profile". The subscriber data that is managed may include identity information, authentication information, personalization information, policy settings, and settings for specific services. In a particular embodiment, the subscriber data management includes a Subscriber Profile Repository (SPR).

NMS 114 manages the network elements, also called managed devices, within communication system 100. In a particular embodiment, NMS 114 may include discovery, fault/event monitoring, and provisioning of network elements. Device management may include fault, configuration, accounting, performance, and security management. Management tasks include discovering network inventory, monitoring device health and status, providing alerts to conditions that impact system performance, and identification of problems, their source(s) and possible solutions. NMS 114 may further collect device statistics and may maintain an archive of previous network statistics including problems and solutions that were successful in the past. If faults recur, NMS 114 may search the archive for the possible solutions. Analytics module 116 analyzes network traffic received by server 104 in real-time and provides for a view of network use within communication system 100. Analytics module 116 may include analysis, profiling, modeling, and database functions.

In accordance with one or more embodiments, network, service, and subscriber abstraction module 104 is configured to either collection information or data, or facilitate other functions from collecting information or data from various network elements within communication system 100. In the case of collection, network, service, and subscriber abstraction module 104 is configured to abstract the data by examining one or more correlating factors between collected data such as an Internet Protocol (IP) address or mobile subscriber identifier, combine the correlating data together based upon the correlating factors into a consistent store of data which can be later accessed and utilized. As a result, network, service, and subscriber abstraction module 104 creates structured data from unstructured data. Network, service, and subscriber abstraction module 104 is configured in at least one embodiment to collect data from one or more of network services layer 112, NMS 114, and analytics module 116 for abstraction and storage. The abstraction function provides a stateless communications plane for service aggregation and protocol conversion. The abstraction function is stateless but in various embodiments, the database is not stateless. In one or more embodiments, the collection of data may be an active-pull in which network, service, and subscriber abstraction module 104 is pulling information from a particular network element. In other embodiments, the collection of data may be an active-push in which a network element is pushing specific information to network, service, and subscriber abstraction module 104 on configured thresholds or time windows. In still other embodiments, network, service, and subscriber abstraction module 104 may collect the data in a passive manner as the data passes through it. The abstraction layer includes a mobile IP network enabler that provides a service aggregator function. The aggregation function provides for collection and coordination of real-time network, subscriber, application intelligence (such as packet core, probes, and other elements) for service enablement. An API gateway provides a protocol translation function, securely enabling deeper integration with third parties. OSS integration provides billing and settlement integration into existing OSS, as well as 3rd party Service Brokers to provide orchestration workflows.

Server 102 is in communication with a client device 118, a radio access network infrastructure 120, network infrastructure 122, and integrated applications 124 through network infrastructure and service abstraction layer 106. In a particular embodiment, client device 118 may include any mobile client device such as a mobile telephone, a smartphone, or a tablet. In a particular embodiment, client device 118 may include mobility, analytics, virtual desktop infrastructure (VDI)/virtual experience infrastructure (VXI), unified communications and collaboration (UC&C), video, and administration functions. RAN infrastructure 120 include hardware and software configured to implement radio access network functions and may include operations maintenance center radio (OMC-R), small cell, eNB/NB/BTS, RAN optimization, RRH/BBU, and radio network controller (RNC) functions. Network infrastructure 122 includes hardware and software configured to implement wired network infrastructure functions and may include optical, routing, legacy IN, Ethernet, MPC, and location functions. Integrated applications 124 are configured to provide integrated application functions such as multimedia functions to fixed or mobile subscribers. In particular embodiments, the multimedia functions may include video, voice over IP (VOIP), and IP Multimedia Subsystem (IMS).

Network, service, and subscriber abstraction module 104 is further configured in at least one embodiment to collect data from one or more of client device 118, RAN infrastructure 120, network infrastructure 122, and integrated applications 124 for abstraction and storage.

Server 102 is further in communication with enterprise applications 126 via application/3rd party API gateway 108, and operator OSS infrastructure 128 via enterprise service bus 110. Enterprise applications 126 provide third party services and operations support systems (OSS) services to subscribers in the network. In particular embodiments, enterprise applications 126 may include an application server and OSS functions. In one or more embodiments, enterprise applications 126 may provide enterprise applications to communication network 100. In particular embodiments, enterprise applications may include collaboration, video communications, and email services hosted either within or without the enterprise systems. Operator OSS infrastructure 128 supports processes such as maintaining network inventory, provisioning services, configuring network components, managing faults, taking orders, processing bills, and collecting payments. In a particular embodiment, operator OSS infrastructure 128 may include billing, customer care, service fulfillment, and service assurance components. The enterprise OSS may include customer care, enterprise service/application fulfillment, employee asset tracking, information security rules, and other enterprise functions. The billing component may include retail billing which enables operators to generate a customer bill based on service plan, usage, promotions, and other OSS interactions, and enabling third parties to leverage operator billing systems for charging a subscriber such as for an in-app purchase that appears on the customer's bill, allowing third party Wi-Fi providers to bill the subscriber, or service delivery platform interaction (e.g., ringtone download). The billing component may also differentiate enterprise data usage (that is relevant to work tasks) from consumer data usage (that is relevant to personal tasks) from the same device with the same subscriber identity. The billing component may also enable an analytical based approach to understanding subscriber billing trends as a means of providing information to an operator that might facilitate service creation, campaign creation, pricing, etc. This may be for a prepaid user or an enterprise shared data plan user, in which case the billing system also manages quota/balance in real-time, converged (across multiple access types) and postpaid.

The customer care component may include customer interaction systems to provide channels for customer self-service, enterprise IT self-service and direct machine-to-customer information, customer relationship management to provide sophisticated marketing, sales and operational support to the service provider agents who interact with the customer, and subscriber management software to support care agents and direct customer interaction. The service fulfillment component may include systems to provide order management systems to orchestrate the steps needed to implement customer orders, handle interdependencies, requests to other content service providers (CSPs), cloud service providers and enterprise platform-as-a-service (PaaS), and manual work orders. The service fulfillment component may further include inventory management systems to track the inventory available to supply services in the network, assign resources, design network connections, and discover network configurations and reconcile them with inventory records. The service fulfillment component may further provide for activation to automatically configure network equipment and network-serving systems to provide a subscriber-requested service, and engineering tools refers to support engineers who plan, design, install and configure networks and services, including planning and design tools, outside plant and geographical information systems, and network installation and configuration tools.

The service assurance component may include service management systems to link customers with their individual services, and enable CSPs to generate granular reports on each customer and service to validate service-level commitments. The service assurance component may further include performance-monitoring systems to collect circuit-switched and packet data from the network elements and element management systems supplied by equipment manufacturers and provide reports for operations staff. The service assurance component may further include workforce automation software used to track incidents resulting from service disruption and effectively dispatch field resources, and probe systems rely on dedicated hardware and software agents to collect signaling and media data from the network. In at least one embodiment, the various components of communication system 100 may interoperate to provide professional services 130 including business consulting, design consulting, product-related services, system integration, outsourced operations and hosted management services.

In various embodiments, network, server, and subscriber abstraction module 104 is configured to provide the abstracted information obtained from data sources within communication system 100, such as client device 118, to an information consumer, such as one or more of enterprise applications 126 and operator OSS infrastructure 128, which uses the information to provide some value-added service to subscribers in the network as will be further described herein. In one or more embodiments, the structured/correlated database is what allows "northbound" systems such as enterprise applications 126 and operator OSS infrastructure 128 to function more effectively.

In the particular embodiment illustrated in FIG. 1, network services layer 112, NMS 114, client device 118, RAN infrastructure 120, integrated applications 124, the application server of enterprise applications 126 have push/pull data connections with network, service, and subscriber abstraction module 104. Further, in the particular embodiment illustrated in FIG. 1, analytics module 116, network infrastructure 122, the OSS functions of enterprise applications 126, and the component of operator OSS infrastructure 128 have a pull connection with network, service, and subscriber abstraction module 104. In still other embodiments, the one or more components may have push connections, pull connections, or both push and pull connections with any other component.

The phenomenal growth of mobile networking is presenting mobile operators with tremendous opportunities along with corresponding challenges as they race to add capacity and services to meet accelerating demands. Mobile operators worldwide are seeing tremendous growth in mobile data subscriptions and bandwidth usage. The emergence of "over-the-top" and offnet applications and services (such as those from salesforce.com, Skype, gaming vendors, and applications stores is impacting the return on investment (ROI) of mobile operators. Consumers can utilize these applications and services, which use the operator's network, without providing even an incremental usage fee to the mobile operator. While operators benefit in the near term with new subscriptions, long term there are profitability challenges from the explosion of data traffic. To take advantage of the mobile Internet explosion, mobile operators must add value to third party service transactions. This value can be extracted in terms of new revenue and profit. Without this value add, mobile operators risk becoming simply a bandwidth "bit pipe" provider. As a result, it is critical for mobile operators to invest strategically in their network assets allowing them to launch new services and go beyond flat-rate data plans. In current networks, various pieces of information like location of a subscriber and the reachability of a subscriber etc distributed in various network elements throughout the network and there is no single entity in the network that can aggregate the information present in the different network elements, correlate the information, and feed that information to various external entities.

The current challenges for creating new services may include: Long time to availability—typically twelve to eighteen months to enable services; service silos—building one service doesn't always help build the second service; personalization—each service has unique requirements; no killer application—market conditions vary between operators and regions; and lag in response times—it is difficult to quickly create or modify services in response to market trends. While operators have significant challenges, they also have significant market advantages and unique value. For example, application developers are often clamoring to leverage information only available in the network. Application provider challenges include: restricted or no access to the network; limited visibility into accurate location information in high volume, no real time access; lack of desire to understand or communicate with the complex operator topology; difficulty in correlating multiple sources/vendors; and lack of standard interfaces to carrier applications/services.

Mobile operators have the opportunity to leverage the key asset in their networks—real-time subscriber, application, and network intelligence—and build an architecture that harvests this intelligence to monetize the network. Various embodiments described herein provide a monetization architecture that increases service velocity, quickly enabling multiple use cases, while providing a platform for application developers to leverage the network. This may provide increased revenue for both the operator and application developers, while enhancing the subscriber experience.

At least one embodiment solves the problem of abstracting out data from different sources and organizing the data into a coherent format that can be translated into one or more external protocols such as Hypertext Transfer Protocol (HTTP), Extensible Messaging and Presence Protocol (XMPP), and Diameter Protocol. Diameter is an authentication, authorization, and accounting protocol for computer networks and is described in Internet Engineering Task Force (IETF) Request for Comments (RFC) 6743. Existing systems are not capable of determining which source, of a plurality of sources, contains the information requested, correlating data from multiple sources, perform analytics and present the information in a coherent format in a network wide scalable way. In addition, existing systems require more than one entity to perform similar functions, but still lack scalability to provide network scale solutions.

In various embodiments, network, service, and subscriber abstraction module 104 may further function as a data flow engine that incrementally correlates the data from various sources to extract useful network-wide information. This along with high horizontal scalability allows network, service, and subscriber abstraction module 104 to provide network level abstraction to applications and OSS systems in Enterprise Applications 126. In various embodiments, network, service, and subscriber abstraction module 104 collects network wide data, performs a set of transformations on the data and correlates the data to make it presentable in a coherent format that can be used by entities outside network, service, and subscriber abstraction module 104.

In particular embodiments, communication system 100 provides for a flexible mobile architecture/framework that enables operators to quickly create and modify use cases for monetization by harvesting, abstracting, and monetizing intelligence from the network. Monetization uses which may include such services as general consumer control points, targeted ad insertion, video, Femto/Wi-Fi/location/presence information, collaboration, telepresence, congestion/control, telematics, remote/video surveillance, automatic metering infrastructure, ATM/POS, remote monitoring/automation, information display, IMS cloud, voice and video over LTE, and messaging.

Figure 2:
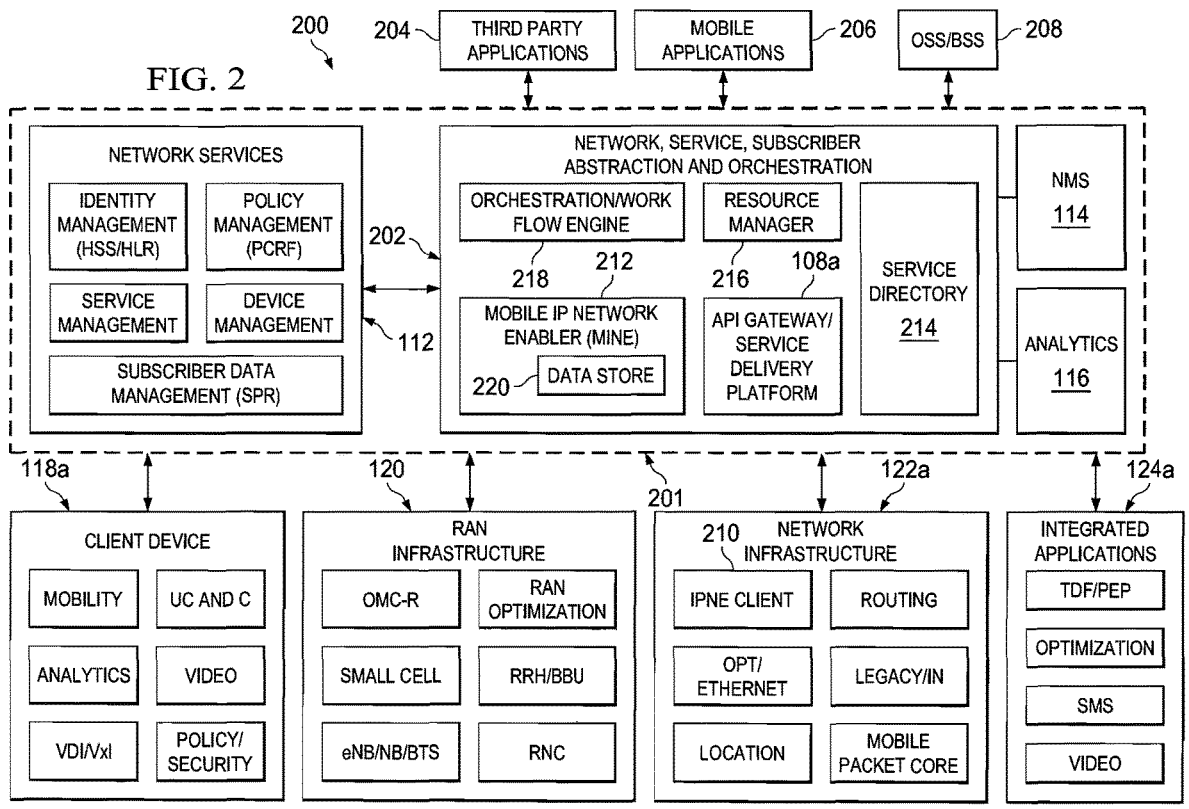
FIG. 2 is a simplified block diagram showing an embodiment of a hierarchical architectural framework of a communication system for orchestrating mobile networks in accordance with another embodiment of the present disclosure.

Referring now to FIG. 2, FIG. 2 is a simplified block diagram showing an embodiment of a hierarchical architectural framework of a communication system 200 for orchestrating mobile networks in accordance with another embodiment of the present disclosure. In the embodiment of FIG. 2, communication system 200 includes four hierarchical layers. A first layer, a network layer, includes client device 118a, radio access network (RAN) infrastructure 120, network infrastructure 122a, and integrated applications 124a. The network layer may include fundamental network elements of one or more mobile packet core platforms and the services contained within these platforms. A second layer may include a network, service, subscriber abstraction, orchestration module 202, analytics module 116, and network management services component 114. A third layer may include a network services 112, and a fourth layer may include higher level services and applications provided by a service provider including third party applications 204, mobile applications 206, enterprise applications 126, OSS/BSS elements 208, and other billing, network management, and third party and/or operator applications. In a particular embodiment, network services 112, NMS 114, analytics 116 and network, service, subscriber abstraction, orchestration module 202 may be embodied within a server 201. Network infrastructure 122a includes an Internet Protocol network enabler (IPNE) client 210 that performs an interworking function to interface the network layer elements of the mobile packet core with network, service, subscriber abstraction, orchestration module 202. In a particular embodiment, network, service, subscriber abstraction, orchestration module 202 interfaces with capabilities of the mobile platform via Extensible Messaging and Presence Protocol (XMPP)/Extensible Markup Language (XML) and RESTFul interfaces as transport mechanism to expose these capabilities using an XML schema. XMPP is a communications protocol for message-oriented middleware based on XML. XML is a markup language that defines a set of rules for encoding documents. Representational State Transfer (REST) is a style of software architecture for distributed systems and includes requests and responses built around the transfer of representations of resources. A resource can be essentially any coherent and meaningful concept that may be addressed and a representation of a resource is typically a document that captures the current or intended state of a resource. Typically, a client begins sending requests when it is ready to make a transition to a new state. The representation of each application state may contain links that may be used the next time the client chooses to initiate a new state-transition. Conforming to REST constraints is generally referred to as being "RESTful." Capabilities and data that are exposed is stored in network, service, subscriber abstraction, orchestration module 202 database as will be further described herein. The network layer may further include other components that make up the network platform including client side capabilities providing linkages to other domains.

In various embodiments, network, service, subscriber abstraction, orchestration module 202 contains sub-elements including a API gateway/service delivery platform 108, mobile IP network enabler (MINE) component 212, a service directory component 214, a resource manager component 216, and an orchestration/work flow engine 218. MINE component 212 functions as an interface layer to IPNE client 210 and contains a central storage 220 to store network information such as call records and network structures that may be later accessed. In a particular embodiment, central storage 220 may be based upon a distributed file system structure and may be accessed by an XMPP interface. Access to the lower layer and requesting information from the network layer is performed through MINE component 212. MINE component 212 provides a single entry point to the network and also orchestrates network requirements.

Services directory component 214 is configured to publish network capabilities and resource availability for higher layer services. Resource manager component 216 is configured to publish network capabilities and resource availability for applications such as third party and operator applications. In various embodiments, service directory component 214 and resource manager component 216 perform publishing of these capabilities directly through MINE 212 component. In particular embodiments, service directory component 214 and resource manager component 216 publish capabilities through MINE component 212 using an interface such as an XMPP interface. In still other embodiments, service directory component 214 and resource manager component publish capabilities through MINE component 212 using application/3rd party API gateway 108.

API gateway/service delivery platform 108a exposes capabilities to the higher-level services and applications of the fourth layer such as third party applications 204, mobile applications 206, OSS/BSS elements 208, and other billing, network, network management, and third party and/or operator applications. In a particular embodiment, API gateway/service delivery platform 108a exposures capabilities to the higher-level services and applications of the fourth layer via a standards based GSMA OneAPI interface by the Groupe Speciale Mobile Association (GSMA). API gateway/service delivery platform 108a is further configured to provide adapters to standard service provider billing and backend systems. In at least one embodiment, the combination of these layers allows a service provider to rapidly implement new service and features. Orchestration/work flow engine 218 is configured to orchestrate various network elements and coordinate workflows between network elements using MINE component 212 as will be further described herein.

Analytics module 116 provides functions including leveraging data store 220 provided by MINE component 212 and analyzing network status based upon request from orchestration/work flow engine and responding via a specific trigger that may be applied to the network via a policy function. In a particular embodiment, MINE component 212 is configured to interface with analytics module 116 via an XMPP interface and/or standard mobile interfaces. In one or more embodiments, analytics module 116 may contain an analytics engine component, a modeling component, a profiling component and a visualization component. In various embodiments, analytics module 116 subscribes to information that is contained in data store 220 of MINE component 212 that analytics module 116, and analytics module 116 may uses this information to perform historical trend analysis. In some embodiments, MINE component 212 may be further configured to send real time feeds of data to analytics module 116 so that analytics module 116 may perform immediate processing of the data and/or respond to one or more triggers. In another embodiment, MINE component 212 may request a query be performed on data, making analytics module 116 subservient to MINE component 212, or more specifically making MINE component 212 a controller of analytics module 116. MINE component 212 may then trigger particular actions based on a query response received from analytics module 116.

Network services 112 may provide one or more of identity management, policy management, service management, device management, and subscriber data management functions that may exist within a service provider network. MINE component 212 is configured to provide a link between the functions provided by network services 112 and other network elements.

In accordance with various embodiments, one or more of the network elements of communication system 200, such as the mobile packet core of network infrastructure 122a and the TDF/PEP, optimization, and IMS elements of integrated applications 124a may be subscriber-aware network elements that are aware of the identity of a subscriber utilizing the network elements or services. Further, in various embodiments, network services include subscriber databases such as the HSS/HLR, PCRF, OCS, and SPR. In accordance with various embodiments, network, service, subscriber abstraction, orchestration module 202 provides interconnection between the subscriber-aware network elements and the subscriber databases. In various embodiments, network, service, subscriber abstraction, orchestration module 202 orchestrates and coordinates workflow between the subscriber aware network elements and subscriber databases, and provides protocol translation between the various network elements and databases.

In accordance with various embodiments, the above-described framework allows service providers to easily offer services related to their network capabilities, dynamically optimize those capabilities, and create an environment, which enables rapid service enablement. Various embodiments of the described architecture allow a mobile service provider, a fixed line provider, and/or large enterprises to create a platform, which exposes network capabilities and allows application developers and walled gardened application developers to leverage the power of the network. Various embodiments may allow service providers to monetize the capabilities of the network by optimizing the infrastructure and then creating a service framework that allows service providers to quickly and efficiently create new service offers. In at least one embodiment, the above-described architecture integrates with the existing capabilities of the service provide to avoid "rip and replace" scenarios and ensures faster time to market.

One or more embodiments may provide one or more advantages including leveraging the existing service provider environment to eliminate a "rip and replace" scenarios, and allowing easy access to network capabilities which have historically been very difficult for application developers and service providers to access.

In one or more embodiments, create a policy framework having three fundamental elements including policy, network abstraction and orchestration and analytics tied together in conjunction with network access. Various embodiments provide a service creation environment that ties these elements together into existing service provider OSS/BSS systems. Various embodiments of this framework may be used to create/run multiple different services such as business to consumer (B2C), business-to-business (B2B), machine-to-machine (M2M), and security services. Further, one or more embodiments one or more embodiments may provide a massively scalable framework that may be deployed in a cloud based architecture.

In an example workflow, network, service, subscriber abstraction, orchestration module 202 receives a service request from enterprise applications 126 such as an enterprise IT Telepresence server to a client device associated with a subscriber. In various embodiments, network, service, subscriber abstraction, orchestration module 202 provides protocol translation between network elements. In a particular example, the request from the third party provider is formatted as an HTTP/WebRTC request. The request includes a request for a guarantee of a particular quality of services for a predetermined time period. In response, orchestration/work flow engine 218 generates a DIAMETER request from the HTTP request and sends the DIAMETER request to the policy management, such as the PCRF, of network services 112 to determine if the service request meets one or more policies associated with the subscriber. Orchestration/work flow engine 218 may also generated a DIAMETER request to the identify management service, such as the HSS, of network services 112 to determine the identity of the subscriber associated with the service request, generate a DIAMETER request to OSS/BSS 208 to determine if the billing system will allow the service request. Orchestration/work flow engine 218 may further send a request to the mobile packet core of network infrastructure 122a to determine if there is any congestion in the network. Orchestration/work flow engine 218 may further send a request to the RAN Optimization of RAN infrastructure 120 to determine if there is congestion on the radio interface. In still other examples, orchestration/work flow engine 218 may request information from analytics module 116 to determine, based on historical information stored by analytics module 116, whether the network will be congested in the predetermined time period. Based on responses to these various requests, orchestration/work flow engine 218 may determine whether the initial request from the enterprise provider will be allowed.

Figure 3:
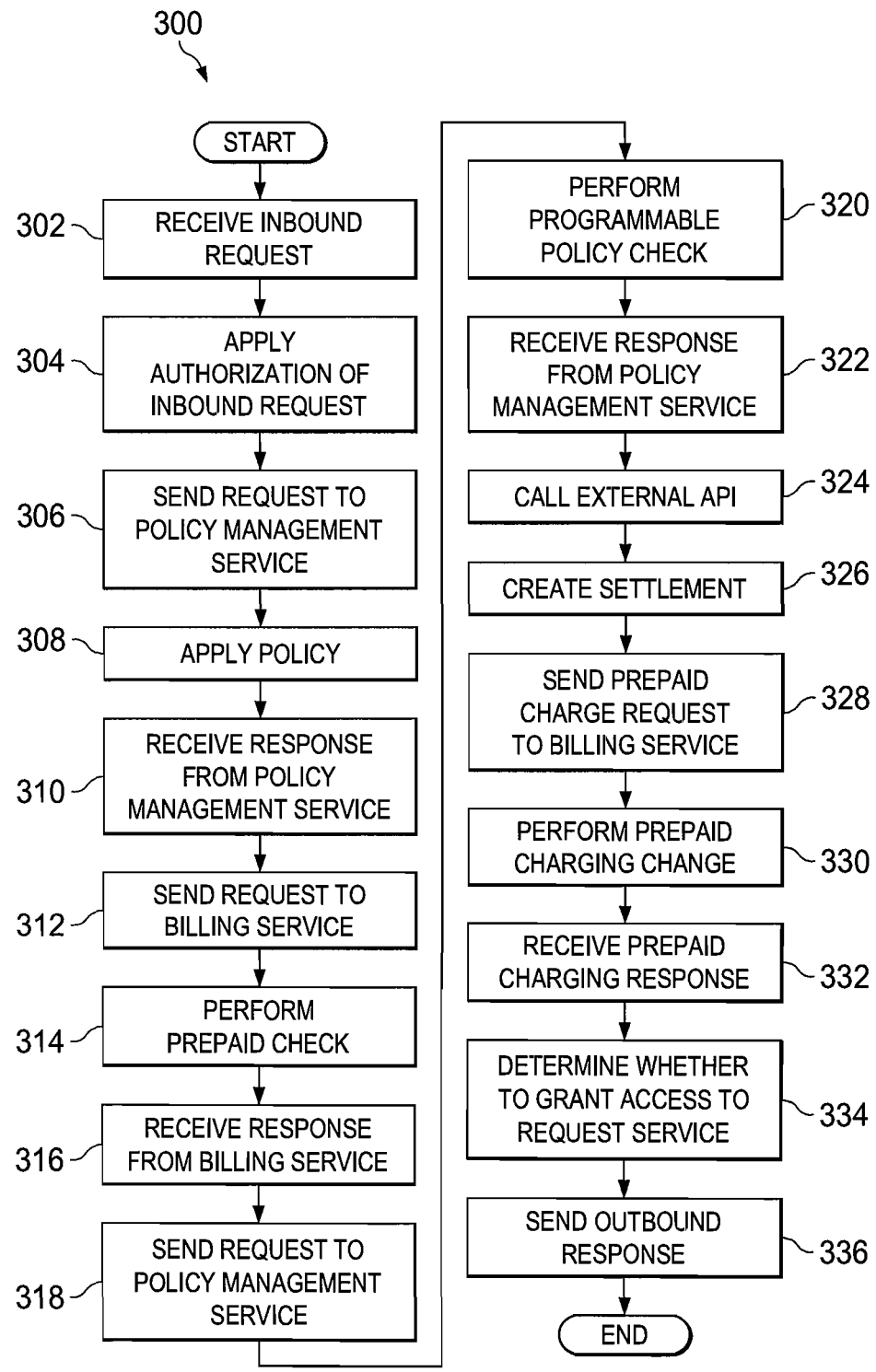
FIG. 3 is a simplified flow diagram of an embodiment of workflow coordination operations performed by a orchestration/work flow engine.

FIG. 3 is a simplified flow diagram 300 of an embodiment of workflow coordination operations performed by orchestration/work flow engine 218. In 302, orchestration/work flow engine 218 receives an HTTP inbound service request from client device 118a associated with a subscriber. In a particular embodiment, the inbound service request is an HTTP inbound request. In at least one embodiment, the inbound request includes a request from an application of client device 118a for the providing of one or more services by the network to client device 118a. In a particular example, the request is a request for a streaming media presentation, such as a Telepresence session or other video/audio collaboration. In 304, orchestration/work flow engine 218 applies authorization into network services 112. In 306, orchestration/work flow engine 218 sends a request to the policy management service of network services 112 to determine whether the inbound request conforms to one or more policies associated with client device 118. In a particular embodiment, the policy management services is a PCRF. In 308, the policy management service applies one or more policies associated with the subscriber to the request to determine if the request is in compliance with the one or more policies. In accordance with various embodiments, a policy may be defined in any number of ways. For example, a policy could describe how to enforce a rule against a particular IP flow, the services that need to be orchestrated together to apply for a particular user service, or a set of security rules. In another example, the policy may describe which services are applicable to an application request and how those services show be orchestrated together in order to provide the requested service. In a particular example, a policy may describe how to orchestrate video optimization, deep packet inspection, and firewall services for a request for a Telepresence session. In 310, orchestration/work flow engine 218 receives a response from the policy management service regarding whether the request is in compliance with the one or more polices.

In 312, orchestration/work flow engine 218 sends a request to a billing service to perform a prepaid check to determine whether the subscriber has prepaid for the requested service. In a particular embodiment, the billing system is an OCS. In 314, the billing service performs the prepaid check to determine whether the subscriber has prepaid for the requested service. In 316, orchestration/work flow engine 218 receives a response from the billing service indicating whether the subscriber has prepaid for the requested service. In 318, orchestration/work flow engine 218 sends a request to the policy management service regarding whether the service request complies with one or more programmable policies. In various embodiments, the programmable policies are access control policies that are programmable such as by an application or administrator. In 320, the policy management service performs a check to determine whether the service request complies with the one or more programmable policies. In 322, orchestration/work flow engine 218 receives a response from the policy management service indicating whether the initial request complies with the one or more programmable policies.

In 324, orchestration/work flow engine 218 may call an external application-programming interface (API) in instances in which a third party services needs to be invoked to satisfy the initial service request. In a particular embodiment, the call to the external API is a call to an external HTTP endpoint associated with the external API. In 326, orchestration/work flow engine 218 creates a settlement for the service request. In 328, orchestration/work flow engine 218 sends a prepaid charge request to the billing service in order to request a charge for the service. In 330, the billing system performs a prepaid charging change in order to charge the subscriber for the created settlement. In 332, orchestration/work flow engine 218 receives a prepaid charging response indicating that the prepaid charging change has been performed.

In 334, orchestration/work flow engine 218 determines whether to grant access to the requested service to client device 118a. In at least one embodiment, orchestration/work flow engine 218 determine whether to grant access to the requested service by correlating the responses received from the network elements and services and making a decision based on the responses regarding whether the service request will be granted. For example, in a particular embodiment if any of the responses in the chain or responses indicate that the service request should not or cannot be granted, orchestration/work flow engine 218 will not grant the service request to client device 118a. For example, if the PCRF indicates that the service request will not satisfy a particular policy, if analytics module 116 indicates that there will not be available QOS for the predetermined time period necessarily to provide the requested service, or if the OCS indicates that the subscriber will not have enough balance remaining to pay for the requested service, orchestration/work flow engine 218 may indicate that the requested service will not be granted to client device 118a. In 336, orchestration/work flow engine 218 sends an outbound response message to client device 118a indicating whether the client device 118a is granted access to the requested service. In a particular embodiment, the outbound response is an HTTP outbound response.

Figure 4:
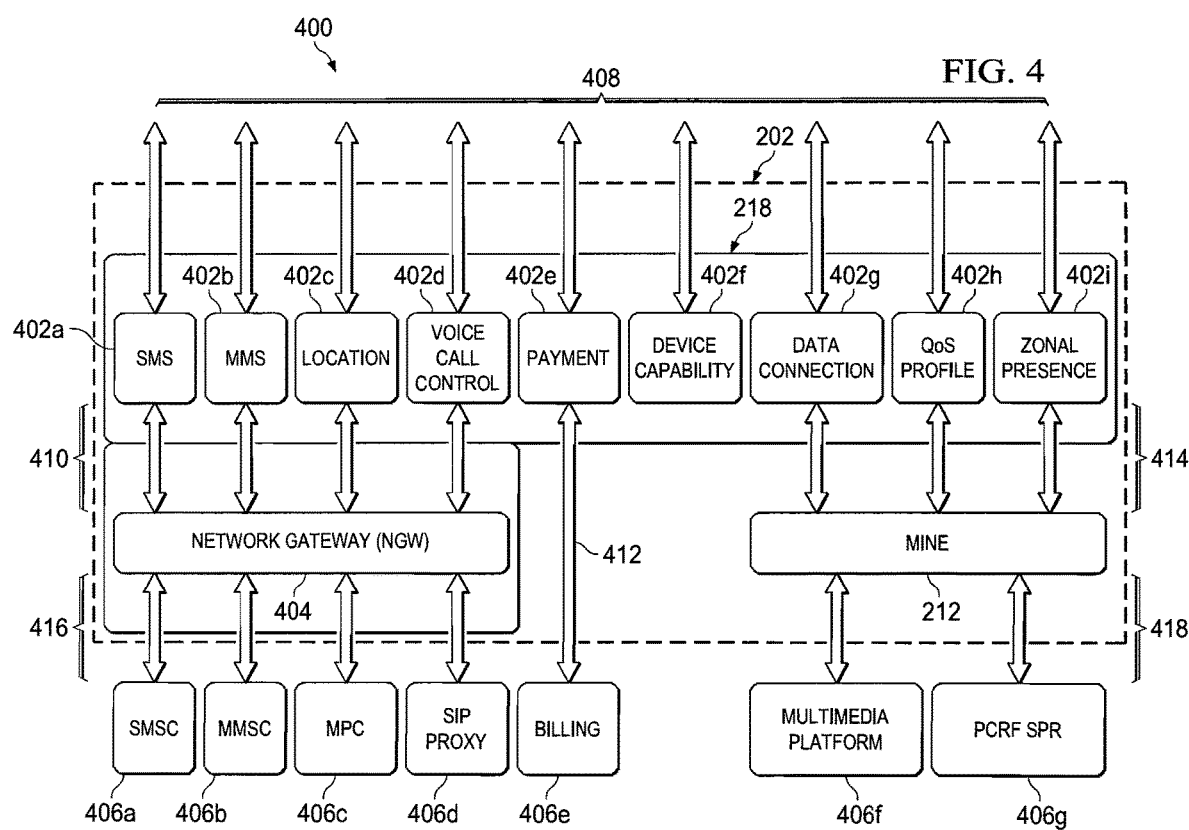
FIG. 4 illustrates an embodiment of the protocol translation platform of the orchestration/work flow engine.

FIG. 4 illustrates an embodiment of a protocol translation platform 400 of orchestration/work flow engine 218. In the embodiment illustrated in FIG. 4, orchestration/work flow engine 218 includes one or more protocol translation modules 402a-402i. In the particular illustrated embodiment, orchestration/work flow engine 218 includes short message service (SMS) translation module 402a, multimedia messaging service (MMS) translation module 402b, location translation module 402c, voice call control translation module 402d, payment translation module 402e, device capability translation module 402f, data connection translation module 402g, QoS profile translation module 402h, and zonal presence translation module 402i. Network, service, subscriber abstraction, orchestration module 202 further includes network gateway (NGW) translation module 404, and MINE 212 in communication with orchestration/work flow engine 218.

Network, service, subscriber abstraction, orchestration module 202 is in further communication with one or more network elements 406a-406g. In the illustrated embodiment, the one or more network elements 406a-406g include short message service center (SMSC) 406a, multimedia messaging service center (MMSC) 406b, mobile platform controller (MPC) 406c, Session Initiation Protocol (SIP) Proxy server 306d, billing service 406e, multimedia platform 406f, and PCRF/SPR 406g. In the particular embodiment illustrated in FIG. 4, SMS translation module 402a, MMS translation module 402b, location translation module 402c, and voice call control translation module 402d are in communication with network gateway translation module 404, and payment translation module 402e is in communication with billing service 406e. Data connection translation module 402g, QOS profile translation module 402h, and zonal presence translation module 402i are in communication with MINE 212. NGW 404 is in further communication with SMSC 406a, MMSC 406b, MPC 406c, and SIP proxy server 406d. MINE 212 is in further communication with multimedia platform 406f and PCRF/SPR 406g.

Each of protocol translation modules 402a-402i and network gateway translation module 404 are configured to receive a message, such as a request, formatted in a first protocol format and translate the message to be formatted in a second protocol format. In the illustrated embodiment of FIG. 4, each protocol translation modules 402a-402i is configured to receive a message formatted in a first format 408. In a particular example, first protocol format 408 is an HTTP format. Protocol translation modules 402a-402d may be configured to translate the message received in the first protocol format 408 to a second protocol format 410 and communicate the translated message to NGW 410. Payment translation module 402e may be configured to translate the message in first protocol format 408 to a third format 412 and communicate the translated message to billing service 406e. Protocol translation modules 402g-402i may be configured to translate the message in the first protocol format 408 to a fourth format 414 and communicate the translated message to MINE 212. In a particular embodiment, fourth protocol format 414 is an XMPP protocol format. Network gateway translation module 404 may be further configured to translate the message received from each of protocol translation modules 402a-402d in second protocol format 410, translate the message into a fifth protocol format 416, and communicate the translated message to network elements 406a-406d. MINE 212 may be configured to translate message received from protocol translation modules 402g-402i in fourth format 414 to a sixth protocol format 418 and communicate the translated message to network elements 406f-406g.

Figure 5:
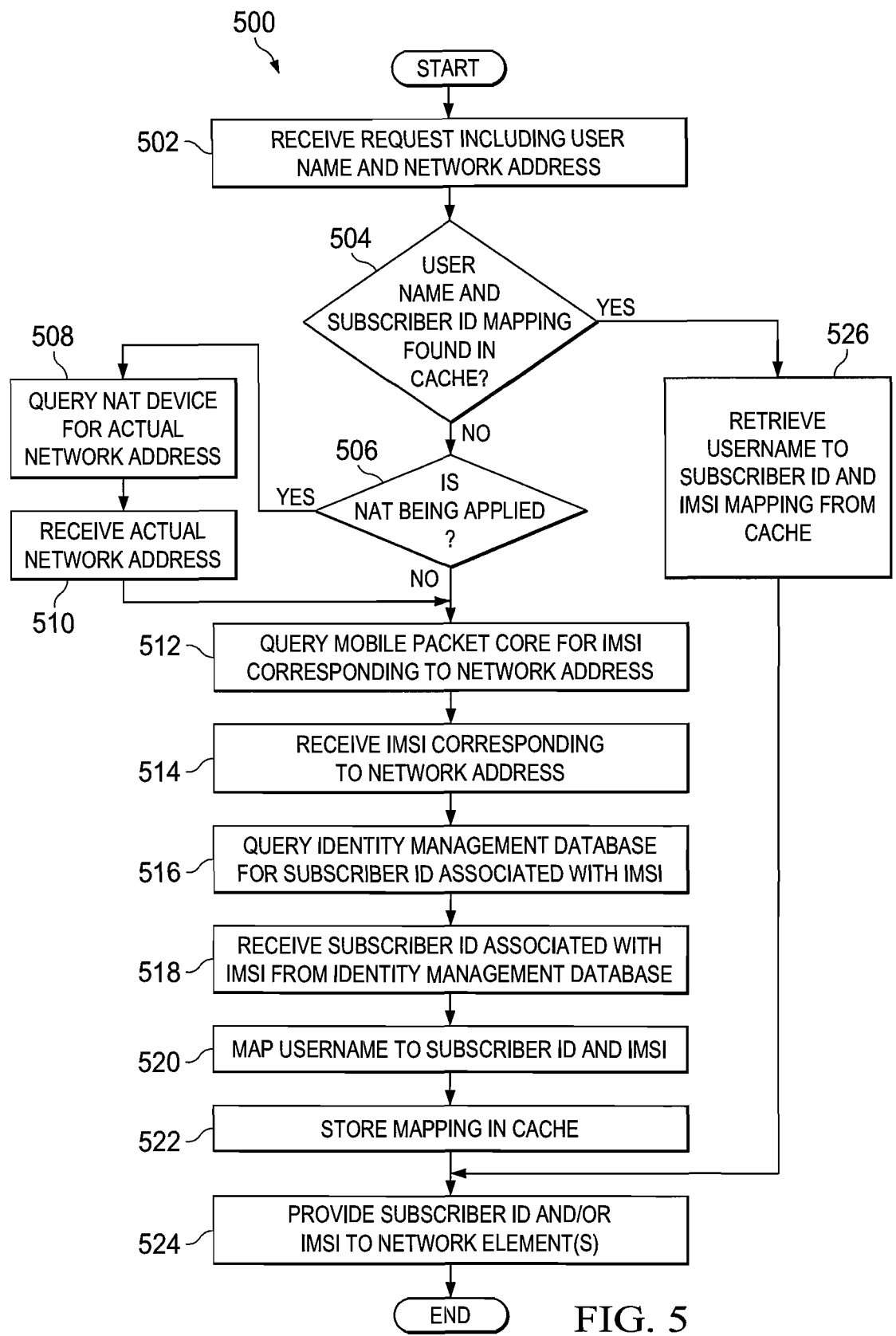
FIG. 5 is a simplified flow diagram of an embodiment of subscriber identity normalization operations performed by the orchestration/work flow engine.

FIG. 5 is a simplified flow diagram 500 of an embodiment of subscriber identity normalization operations performed by orchestration/work flow engine 218. In 502, orchestration/work flow engine 218 receives a request including a username and network address associated with a user who is also a subscriber of a mobile network. In a particular embodiment, the request may be received from a third party service provider such as a an enterprise IT server or enterprise cloud service provider, in response to a request from a client device associated with the user and the username is an identifier used by the third party service provider to identify the user. In the case of an enterprise IT organization, this username may be represented as an email address, employee ID number, or some other enterprise-allocated identifier. In a particular embodiment, the network address is an Internet protocol (IP) address associated with the user as seen by the third party service provider. This IP address may be different from the IP address known to the mobile network if Network Address Translation (NAT) is being applied. In 504, orchestration/work flow engine 218 determines whether a mapping of the received username and a subscriber identifier (ID) is found in a cache associated with orchestration/work flow engine 218. If a mapping of the username and a subscriber ID is not found in the cache, the operations continue to 506. In 506, orchestration/work flow engine 218 determines whether NAT is being applied to the received network address. If NAT is being applied to the received network address, the operations continue to 508 in which orchestration/work flow engine 218 queries a NAT device responsible for the network address translation for an actual network address associated with the received request. In 510, orchestration/work flow engine 218 receives the actual network address associated with the received request and continues to 512. If in 506, orchestration/work flow engine 218 determines that NAT is not being applied, the operations continue to 512.

In 512, orchestration/work flow engine 218 queries the mobile packet core of network infrastructure 122a for an International Mobile Subscriber Identity (IMSI) corresponding to the network address. In 514, orchestration/work flow engine 218 receives the IMSI corresponding to the network address from the mobile packet core. In 516, orchestration/work flow engine 218 queries an identity management database for a subscriber identifier (ID) associated with the IMSI. In a particular embodiment, the subscriber ID is a Mobile Subscriber Integrated Services Digital Network-Number (MSIDN) or a mobile phone number associated with the client device of the subscriber. Although particular embodiments have been described using IMSI and MSIDN identifiers, it should be understood that in other embodiments any type of subscriber identifier may be used. In at least one embodiment, the identity management database is an HSS/HLR. In 518, orchestration/work flow engine 218 receives the subscriber ID associated with the IMSI from the identity management database. In 520, the username is mapped to the subscriber ID and the IMSI. In 522, orchestration/work flow engine 218 stores the mapping of the username, subscriber ID, and IMSI in the cache associated with orchestration/work flow engine 218.

In 524, orchestration/work flow engine 218 provides the subscriber ID and/or IMSI to one or more network elements that will use the IMSI and/or subscriber ID to fulfill the request for service. If it is determined in 504, that the username and subscriber ID mapping are found in the cache associated with orchestration/work flow engine 218, the operations continue to 526 in which orchestration/work flow engine 218 retrieves the subscriber ID and IMSI mapping to the username from the cache and proceeds to 524. After 524, the operations end at 528. By caching of the mapping of the username and externally understood IP address to the subscriber ID, IMSI and mobile network-understood IP address, subsequently requests including the username do not require another query of the network elements such as the identity management database or mobile packet core to determine the subscriber identity and IMSI and IP address mapping.

Figure 6:
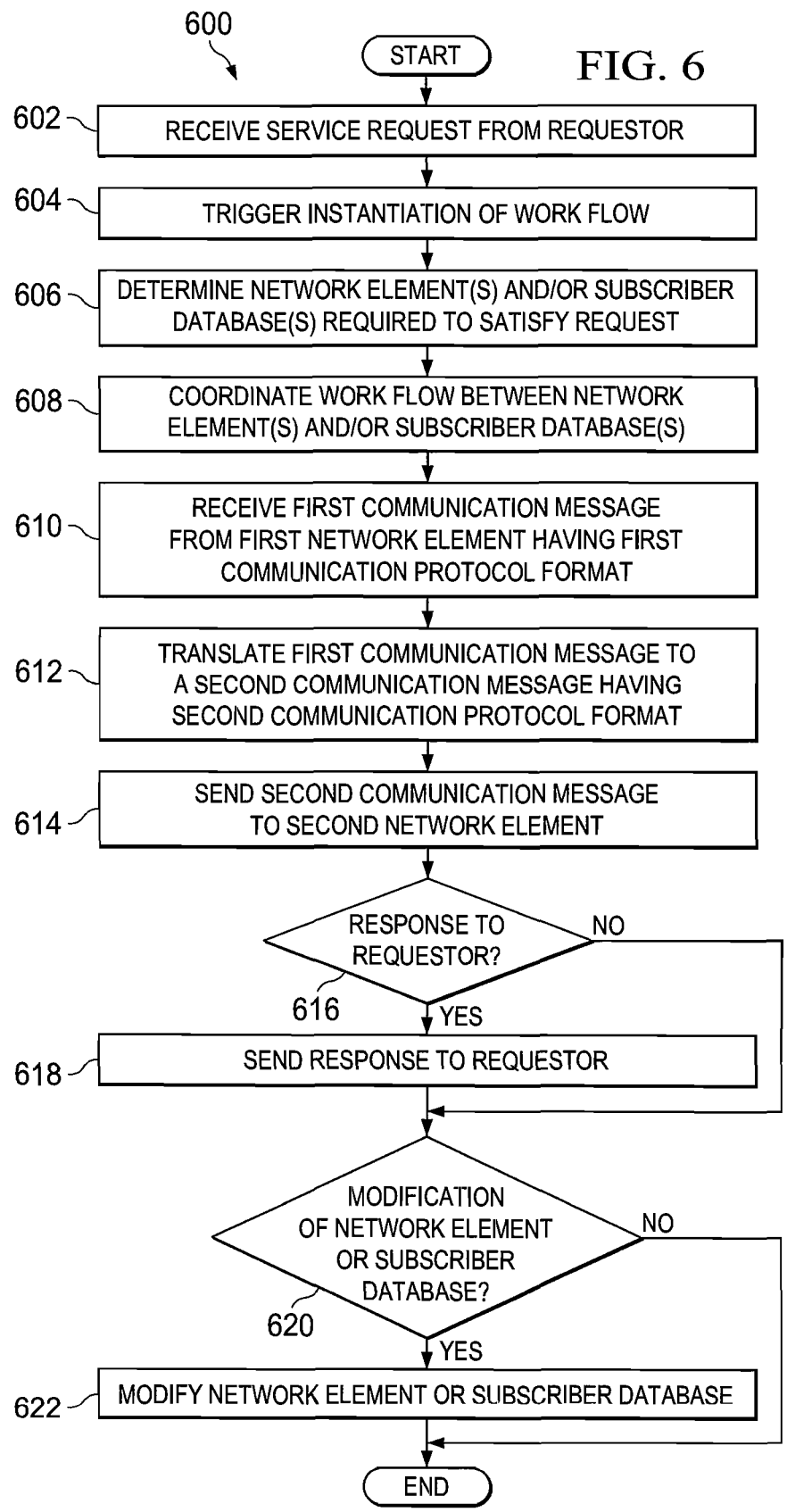
FIG. 6 is a simplified flow diagram of another embodiment of workflow coordination operations performed by the orchestration/work flow engine.

FIG. 6 is a simplified flow diagram 600 of another embodiment of workflow coordination operations performed by orchestration/work flow engine 218. In 602, orchestration/work flow engine 218 receives a service request from a requester. In 604, an instantiation of workflow is triggered in response to the request. In one embodiment, the request is received from an internal network element associated with a requester located inside of communication system 200. In a particular application, the request is received from one of integrated application 124a such as the IMS. In another example, the request is received from the OSS/BSS 208 as a result of a user balance running low to trigger an orchestration/work flow event. In still another example, analytics module 116 may detect congestion and send the request to trigger the orchestration/work flow event. In still another embodiment, the request is received from an external network element that requires the instantiation of a workflow, which will result in a response to the requestor. For example, the request may be received from a third-party streaming media provider. In 606, orchestration/work flow engine 218 determines one or more network elements and/or one or more subscriber databases that required satisfying and orchestrating the request. In 608, orchestration/work flow engine 218 coordinates workflow between the one or more network element(s) and/or subscriber database(s) in order to satisfy the request.

In 610, orchestration/work flow engine 218 receives a first communication message from a first network element having a first protocol format. In 612, orchestration/work flow engine 218 translates the first communication message to a second communication message having a second communication protocol format. In 614, orchestration/work flow engine 218 sends the second communication message to a second network element.

In 616, orchestration/work flow engine 218 determines whether a response to the requester is required. If a response to the requester is required, orchestration/work flow engine 218 sends a response to the requester in 618 and the operations continue to 620. If it is determined in 616 that a response to the requestor is not required, the operations continue to 620. In 620, orchestration/work flow engine 218 determines whether modification of one or more network elements and/or subscriber databases is required by the workflow. If modification of one or more network elements and/or subscriber databases within communication system 200 is required, the operations continue to 622. In 622, orchestration/work flow engine 218 modifies the one or more network elements and/or subscriber databases. In particular embodiments, the modification of configuration information or other data within the one or more network elements and/or subscriber databases.

In a particular example, RAN optimization system of RAN infrastructure 120 detects congestion and notifies PCRF of network services 112 that there is congestion through orchestration/work flow engine 218. The PCRF may instantiate a workflow that requests that video optimization be instantiated for all heavy network users that are nearing their limit on the amount of data that they can consume for the month. Accordingly, the PCRF may initiate a workflow in which the orchestration/work flow engine 218 determines me the heavy users who are nearing their quota limitation by querying the analytics module 116 to determine who are the heavy users, query the online charging system to determine the users who are nearing their quota, return a response to the PCRF. The PCRF may instantiate a rule, which enforces video optimization for these users and triggers a service path where traffic associated with those users goes to the video optimization.

The operations then continue to 624 in which the operations end. If it is determined that modification of one or more network elements and/or subscriber databases is not required, the operations continue to 624 in which the operations end.

Figure 7:
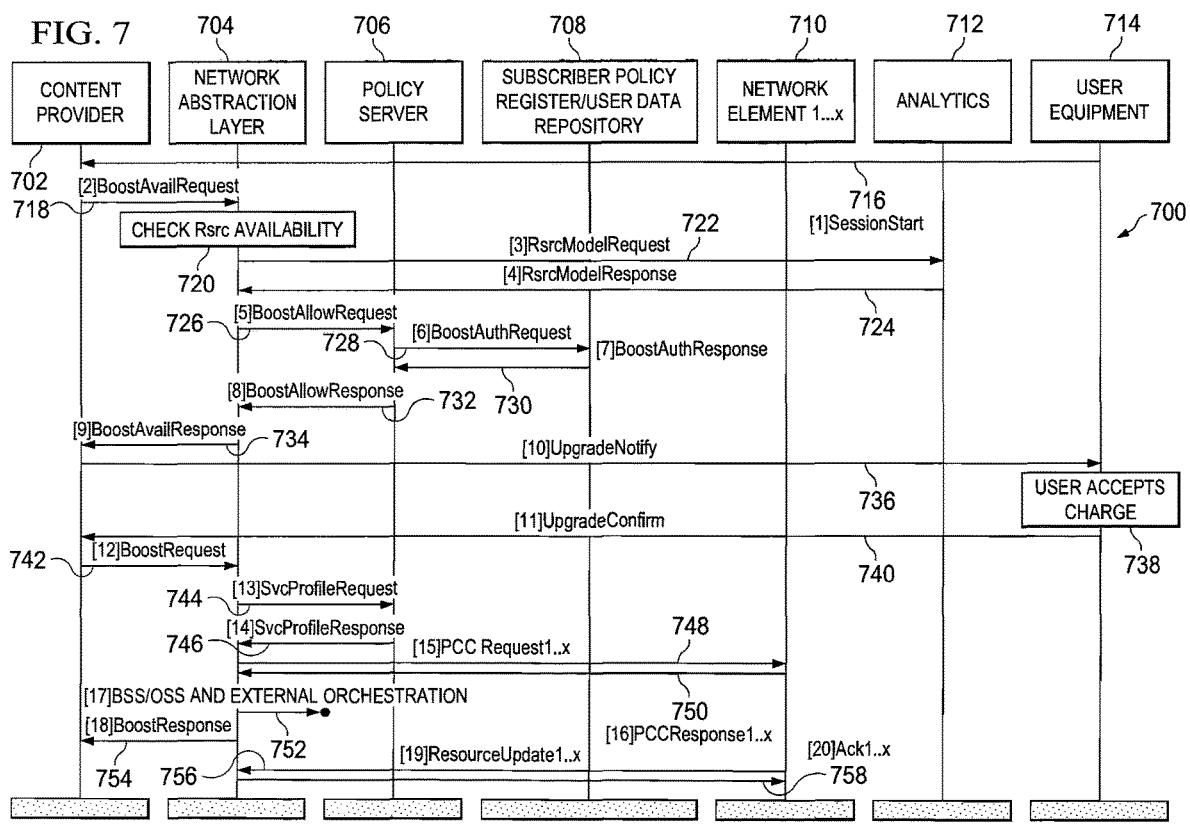
FIG. 7 is a simplified diagram of an embodiment of a call flow of a network, service, subscriber abstraction, orchestration module.

FIG. 7 is a simplified diagram of an embodiment of a call flow 700 of network, service, subscriber abstraction, orchestration module 202. The call flow 700 is illustrated using number of network elements and subscriber databases including a enterprise application 702, a network abstraction layer (NAL) 704 of network, service, subscriber abstraction, orchestration module 202, a policy server (PCRF) 706, a subscriber policy register (SPR)/user data repository (UDR) 708, network element 1 to network element x (NE1 ... X) 710, analytics (AN) 712, and user equipment 714. In at least one embodiment, user equipment 714 is client device 118a. In 716, UE 714 sends a session start request (SessionStart) to enterprise application 702. In the particular embodiment illustrated in FIG. 7, the session start request is a request for a TurboBoost service in which UE 714 is requesting an on-demand dynamic increase in network performance. In 718, enterprise application 702 sends a Boost Availability Request (BoostAvailRequest) to NAL 704. In 720, NAL 704 checks for the availability of the resource(s) required to satisfy the session start request. In 722, NAL 704 sends a Resource Model Request to (ResrchModelRequest) to AN 712 requesting analytics modeling of whether the resource will be available. In 724, AN 712 sends a Resource Model Response (RsrcModelResponse) indicating whether the resource will be available to NAL 704. In 726, NAL 704 sends a Boost Allow Request (BoostAllowRequest) to PCRF 706 requesting whether the service request is to be allowed based upon one or more policies. In 728, PCRF 706 sends a Boost Authorization Request (BoostAuthRequest) to SPR/UDR 708. In 730, SPR/UDR 708 sends Boost Authorization Response (BoostAuthResponse) to PCRF 706. In 732, PCRF 706 sends a Boost Allow Response (BoostAllowResponse) to NAL 704. In 734, NAL 704 sends a Boost Availability Response (BoostAvailResponse) to enterprise application 702.

In 736, enterprise application 702 sends an Upgrade Notification message (UpgradeNotify) to UE 714 indicating that there will be an additional charge to utilize the requested service. In 738, the user accepts the charge. In 740, UE 714 sends an Upgrade Confirmation message (UpgradeConfirm) to enterprise application 702. In 742, enterprise application 702 sends a Boost Request (BoostRequest) to NAL 704. In 744, NAL 704 sends a Service Profile Request (SvcProfileRequest) to PCRF 706 requesting user profile information associated with the user of UE 714. In 746, PCRF 706 sends a Service Profile Response (SvcProfileResponse) to NAL 704 including the user profile information. In 748, NAL 704 sends one or more Policy Charging Control (PCC) Requests (PCCRequest1 ... x) to one or more of network elements (NE1 ... x) 710. In 750, one or more of network elements (NE1 ... x) 710 sends one or more PCC Responses (PCCResponse1 ... x) to NAL 704.

In 752, NAL 704 performs orchestration of a BSS/OSS and external network elements necessary to provide the requested service. In 754, NAL 752 sends a Boost Response (BoostResponse) to enterprise application 702. In 756, network elements (NE1 ... x) 710 send one or more Resource Update messages (ResourceUpdate1 ... x) to NAL 704. In 758, NAL 704 sends one or more acknowledgement messages (Ack1 ... x) to one or more of network elements (NE1 ... x) 710. It should be understood that each of the messages exchanged between the network elements and subscriber databases may be received in a particular protocol format utilized by the sending network element and translated to a particular protocol format utilized by the receiving network element.

FIG. 8 is a simplified block diagram 800 illustrating a particular embodiment of server 201 of communication system 200 of FIG. 2. The particular embodiment of server 201 of FIG. 2 includes a processor(s) 802, memory element 804, and network, service, subscriber abstraction, orchestration module 202. Processor(s) 802 are configured to execute software instructions to perform various operations of server 201 as described herein. Memory element 804 may be configured to store software instructions and data associated with server 201. Network, service, subscriber abstraction, orchestration module 202 is configured to implement the various orchestration, workflow coordination, and translation functions as described herein.

Although the particular embodiment illustrated in FIG. 8 shows server 201 as including a single node, it should be understood that in other embodiments, server 201 may include any number of nodes. In still other embodiments, a cluster may be formed of any number of processing nodes distributed throughout a number of servers or other network elements within a communication network.

In still other embodiments, mobile IP enabler (MINE) component 212 is configured to provide for integrated signaling between one or more network elements associated with a mobile data network and one or more network elements associated with enterprise networks. In particular embodiments, MINE component 212 provides a network address translation function in which an identifier, such as an Internet Protocol (IP) address, associated with a particular user equipment device is mapped to an identifier, such as a username, used by an enterprise network to identify a particular user. Examples of enterprise services offerings that may be provided to the user equipment device by one or more enterprise networks include hosted communications, telepresence, or enterprise voice over LTE services.

FIG. 9 is a simplified conceptual diagram 900 of an embodiment for orchestrating policy in a mobile environment. FIG. 9 shows network, service, and subscriber abstraction layer 202 including mobile IP enabler (MINE) component 212. MINE component 212 is configured to receive information from a number of data sources within the mobile environment including a radio frequency (RF) conditions data source 902, a bandwidth utilization data source 904, and an application usage data source. RF conditions data source 902 is configured to provide information indicative of the conditions of the RF environment within the mobile environment. In a particular embodiment, RF conditions data source 902 is configured to provide an indication of RF congestion experienced by particular user equipment within the mobile environment. Bandwidth utilization data source 904 is configured to provide an indication of bandwidth utilization by particular user equipment within the mobile network. Application usage data source 906 is configured to provide information regarding the application usage of particular user equipment within the mobile environment. For example, in a particular embodiment application usage data source 906 may provide an identity of particular applications, such as a video streaming applications, in use in the mobile network. It should be understood that the data sources shown in FIG. 9 are particular examples and that many sources of data may be used to provide information about the mobile environment to MINE component 212.

In accordance with one or more embodiments, MINE component 212 is configured to perform data orchestration in the mobile environment by pulling information from or using information received from the different sources of information, such as RF conditions, bandwidth utilization and application usage, and provide instructions to one or more service components to produce one or more potential actions within the network to modify the user experience associated with a particular user equipment. One potential action that may be produced is that of modifying a default bearer of user equipment through the PCRF to adjust user throughput (908). For example, in particular embodiments MINE component 212 may instruct the PCRF to throttle the throughput of the user equipment associated with a particular user when the user equipment is determined to be in a congested cell or to recover a the throttled user to the previous throughput when the user moves out of the congested area. Another potential action that may be produced is that of triggering the routing of data associated with particular user equipment to GI/SGi LAN services (910) based upon the type of traffic. For example, a potential action may include MINE component 212 providing information and policy to the Si or SGi LAN in order to steer the user to a data optimization or video optimization service based upon the type of traffic the user is communicating, and/or to providing policy information to the data optimization or video optimization based on the type of compression or optimization used. Still another potential action that may be produced is the ability to offload user traffic to WiFi or a small cell based network from a cellular network based upon the data received by MINE component 212 from the various data sources.

FIG. 10 is a simplified block diagram of an embodiment of a communication system 1000 for orchestrating policy in a mobile environment. Communication system 1000 includes an enterprise customer 10002 in communication with server 201. Server 201 includes network infrastructure and service abstraction layer 106. Network infrastructure and service abstraction layer 106 includes application/3rd party application programming interface (API) gateway 108 and mobile IP enabler (MINE) component 212 as previously discussed herein. In a particular embodiment, enterprise customer 1002 is communication with server 201 via a RESTful interface. MINE component 212 is in further communication with a policy administration service (PAS) 1004 having PCRF component 1006. In a particular embodiment, MINE component 212 is in communication is PAS 1004 using a 3GPP Rx interface. PAS 1004 is in further communication with subscriber policy register (SPR) 1008, balance manager 101, and packet data network gateway (PGW) 1012. In particular embodiments, PAS 1004 is in communication with SPR 1008 via lightweight directory access protocol (LDAP)/Sp 3GPP interfaces, with balance manager 1010 via an 3GPP Sy interface, and with PGW 1012 via a 3GPP Gx interface. PGW 1013 further includes a policy control enforcement function (PCEF) 1013.

PGW 1012 is in further communication with one or more network services 1014, mobility management entity (MME) 1016 and serving GPRS support node (SGSN) 1018. In a particular embodiment, PGW 1012 is in communication with network services 1014 via a 3GPP SGi interface, with MME 1016 via a 3GPP S11 interface, and with SGSN 1018 via 3GPP S4 and Gn interfaces. PGW 1012 is in further communication with an Long Term Evolution (LTE) radio access network (RAN) 1020. In a particular embodiment, PGW 1012 is in communication with LTE RAN 1020 via an S1-U interface. MME 1016 is also in communication with LTE RAN 1020 and SGSN 1018 is also in communication with a 3G RAN 1022. LTE RAN 1020 includes a first base station 1024 in communication with first user equipment (UE) device 1028*a* and second user equipment (UE) device 1028*b*. 3G RAN 1022 includes a second base station 1026 in communication with third user equipment device 1028*c*.

As will be further described herein, MINE component 212 is configured to perform data orchestration in the mobile environment by receiving information associated with one or more of first user equipment device 1028*a*, second user equipment device 1028*b* and third user equipment device 1028*c*, such as RF conditions, bandwidth utilization and application usage, and provide instructions and/or indications to one or more components within communication system 1000 to produce one or more potential actions to modify the user experience associated with the particular user equipment. PCRF 1006 is configured to manage policy information associated with one or more subscribers associated with user equipment devices 1028*a*-1028*c*. In one or more embodiments, the policy information may include one or more Quality of Service (QoS) parameters associated with a subscriber associated with first user equipment device 1028*a*, second user equipment device 1028*b*, and/or third user equipment device 1028*c*. SPR 1008 is configured to store one or more subscriber profiles used by PCRF 1006. Balance manager 1010 is configured to manage balances associated with subscribers.

In one or more embodiments, PGW 1012 acts as an interface between LTE RAN 1020/3G RAN 1022 and network services 1014. In particular embodiments, network services 1014 may include services such as the Internet, video streaming sources, audio streaming services, and other network provided services that a subscriber associated with a particular user equipment device may wish to access. PCEF 1013 is configured to enforce policy changes upon a subscriber as directed by PCRF 1006 such as enforcing a particular QoS associated with the.

MME 1016 is configured to manage session states, authentication, paging, mobility, roaming, and other bearer management functions between PGW 1012 and LTE RAN 1020. SGSN 1018 is configured to manage session states, authentication, paging, mobility, roaming, and other bearer management functions between PGW 1012 and 3G RAN 1022. First user equipment device 1028*a*, second user equipment device 1028*b*, and/or third user equipment device 1028*c* may include any mobile client device such as a mobile telephone, a smartphone, or a tablet. In a particular embodiment, one or more of user equipment devices 1028a-1028c may include client device 118 as previously discussed herein.

FIGS. 11A-11D are simplified flow diagrams showing an embodiment of signaling for modifying a default bearer channel to provide dynamic quality of service (QoS) within communication system 1000 of FIG. 10. In general, a bearer channel provides a logical, edge-to-edge transmission path having a defined QoS between user equipment (UE) and a packet data network gateway (PGW). In conventional systems, once a bearer channel is established with a defined QoS the QoS cannot be changed for that bearer channel. In conventional systems if there is a necessity to provide a different QoS to a particular user equipment device, a new bearer channel must be established having a new QoS. FIGS. 11A-11D illustrates an example operation in which MINE component 212 receives a request to modify a default bearer channel established between first user equipment device 1028a and PGW 1012 in which first user equipment device 1028 is receiving an over-the-top (OTT) service, such as video streaming content, from a content provider over the default bearer channel. For example, a user associated with first user equipment device 1028a may be currently rate-limited and desires to watch a video with upgraded quality from a content provider. The user may be prompted by the content provider with an option to remove the rate cap. If the user chooses to remove the rate cap, MINE component 212 may receive an indication of the choice and send a default modification bearer request to PCRF 1006 to change one or more QoS for the subscriber's default bearer channel. PCRF 1006 may then send the QoS modification request to PCEF 1013 for modification of the default bearer with the updated QoS. First UE 1028a may then utilize the modified bearer channel for a certain time period such as the duration of the video.

Figure 11A:
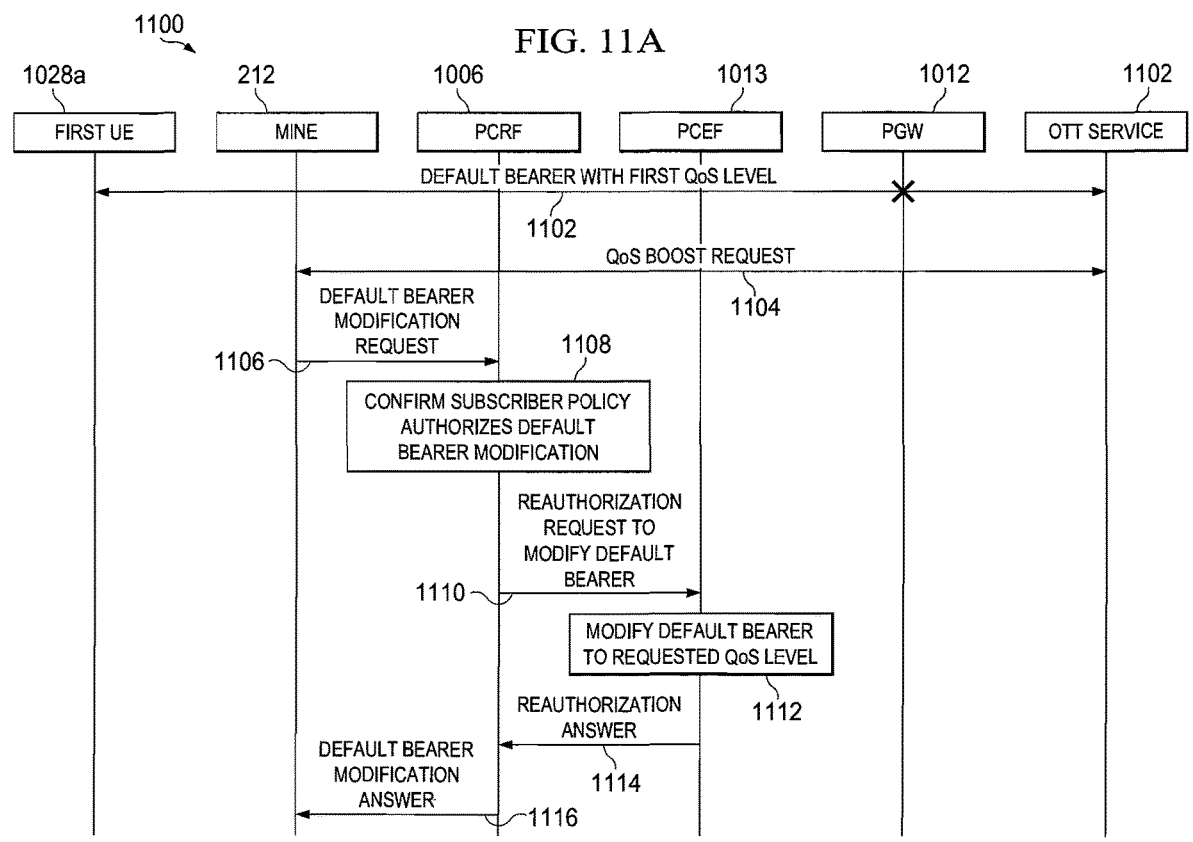

FIG. 11A illustrates a simplified flow diagram 1100 showing an embodiment of signaling for modifying a default bearer to provide an updated quality of service (QoS). In 1102, a default bearer with a first QoS level is established between first UE device 1028a and PGW 1012 to receive content from OTT service 1102 for display to a subscriber associated with first UE device 1028a. In particular embodiments, the default bearer includes first QoS parameters, an access point name, and an aggregate maximum bitrate associated therewith. In 1104, MINE component 212 receives a QoS boost request from OTT service 1102 indicating a request for the QoS assigned to the default bearer to be increased in order to provide a greater quality to first UE device 1028a of content received from OTT service 1102. In a particular embodiment, the QoS boost request is received by MINE component 212 via an HTTP RESTful interface. The QoS boost request may include one or more of the following QoS parameters: MSISDN, QoS Class Identifier (QCI) value, maximum bit rate for uplink (kbps), maximum bit rate for downlink (kbps), guaranteed bit rate for uplink (kbps), guaranteed bit rate for downlink (kbps), application server IP address, application server port number, application server protocol type, duration (sec), volume (kbytes), and sponsor identifier (ID). Although, the An example HTTP RESTful request including QoS parameters specifying an uplink bitrate and downlink bitrate for the modified bearer channel, among other QoS parameters, is as follows:

```
Content-type: application/json
Accept: application/json
{
```

-continued

```
"qosType":{
    "address": ["tel: 2110000004"],
    "qci": 7,
    "maxBitRate": {
        "uplink": 1000,
        "downlink": 1200
    },
    "appServer": {
        "ipAddress": "any",
        "portNumber": "0",
        "protocol": "ip"
    }
  }
}
```

In 1106, MINE component 212 sense a default bearer modification request to PCRF 1006 indicating a request to change a policy associated with the subscriber to provide a higher QoS for the default bearer channel. In a particular embodiment, the default bearer modification request is sent using the Rx interface between MINE component 212 and PCRF 1006 using an authentication application request (AAR) message. In at least one embodiment, the default bearer request includes parameters specifying an aggregate maximum upload bitrate and an aggregate maximum download bitrate for the modified bearer channel.

In 1108, PCRF 1006 confirms that a policy associated with the subscriber authorizes modification of the default bearer to the requested QoS level. In 1110, PCRF 1006 sends a reauthorization request to modify the default bearer channel to PCEF 1013 to the new QoS level. In a particular embodiment, the reauthorization request is sent using the Gx interface between PCRF 1006 and PCEF 1013 using a reauthorization request (RAR) message. In at least one embodiment, the reauthorization request includes parameters specifying the aggregate maximum upload bitrate and the aggregate maximum download bitrate for the modified bearer channel.

In 1112, PCEF 1013 enforces the new QoS level received from PCRF 1006 by modifying the default bearer channel to the requested QoS level. In 1114, PCEF 1013 sends a reauthorization answer to PCRF 1006 indicating that the default bearer message has been modified to the new QoS level. In a particular embodiment, the reauthorization answer is sent using the Gx interface between PCRF 1006 and PCEF 1013 using a reauthorization answer (RAA) message. In 1116, PCEF 1006 sends a default bearer modification answer message to MINE component 212 confirming that the default bearer channel has been modified to the requested QoS level. In a particular embodiment, the default bearer modification message is sent using the Rx interface between PCRF 1006 and MINE component 212 using an authentication application answer (AAA) message.

FIG. 11B illustrates a simplified flow diagram 1118 showing an embodiment of signaling for a successful modification of a default bearer to provide an updated QoS level. In the embodiment illustrated in FIG. 11B, the signal flow of FIG. 11A has been used to successfully modify the default bearer to a second updated QoS level. In 1120, PCEF 1013 sends a credit control update request to PCRF 1006 to report successful modification of the default bearer to the requested QoS level. In at least one embodiment, PCEF 1013 is configured with a trigger event set to trigger the sending of the credit control update request to PCRF 1006 upon a change in QoS of the default bearer channel. In a particular embodiment, the credit control update request message is sent using the Gx interface between PCEF 1013 and PCRF 1006 using a CCR-U message. In 1122, PCRF 1006 sends a credit control update answer message to PCEF 1013 acknowledging receipt of the credit control update message. In a particular embodiment, the credit control update answer message is sent using the Gx interface between PCEF 1013 and PCEF 1013 using a CCA-U message.

In 1124, PCRF 1006 sends a modification success request message to MINE component 212 indicating that the default bearer channel has been modified to the second QoS level. In at least one embodiment, the second QoS level is the requested QoS level. In at least one embodiment, the modification success request message includes information indicating the new QoS values associated with the modified bearer channel. In a particular embodiment, the modification success request message is sent using the Rx interface between PCRF 1006 and MINE component 212 using an RAR message. In 1126, MINE component 212 sends a modification success answer message to PCRF 1006 acknowledging receipt of the modification success request message. In 1128, the modified bearer channel having the second QoS level is established between first UE device 1028a and PGW 1012. First UE device 1028a may then utilize the modified bearer channel to receive content from OTT service 1102.

FIG. 11C illustrates a simplified flow diagram 1130 showing an embodiment of signaling for a failed modification of the default bearer to provide an updated QoS level. In the embodiment illustrated in FIG. 11C, the signal flow of FIG. 11A has been used in an attempt to modify the default bearer to a second QoS level. In 1132, PCEF 1013 sends a credit control update request to PCRF 1006 to report that the attempt to modify the default bearer to the requested QoS level has failed. In at least one embodiment, PCEF 1013 is configured with a trigger event set to trigger the sending of the credit control update request to PCRF 1006 upon a failure of an attempted change in QoS of the default bearer channel. In a particular embodiment, the credit control update request message is sent using the Gx interface between PCEF 1013 and PCRF 1006 using a CCR-U message. In 1134, PCRF 1006 sends a credit control update answer message to PCEF 1013 acknowledging receipt of the credit control update message. In a particular embodiment, the credit control update answer message is sent using the Gx interface between PCRF 1006 and PCEF 1013 using a CCA-U message.

In 1136, PCRF 1006 sends a modification failure request message to MINE component 212 indicating that the default bearer channel modification to the second QoS level has failed. In a particular embodiment, the modification failure request message is sent using the Rx interface between PCRF 1006 and MINE component 212 using an RAR message. In 1126, MINE component 212 sends a modification failure answer message to PCRF 1006 acknowledging receipt of the modification failure request message. In such a situation, first UE device 1028a may continue to use the default bearer channel to receive content from OTT service 1102.

FIG. 11D illustrates a simplified flow diagram 1140 showing an embodiment of signaling for restoring a modified bearer channel to a default quality of service (QoS) level. In the embodiment illustrated in FIG. 11D, the signal flow of FIG. 11B has been used to successfully modify the default bearer to a second updated QoS level. In 1142, MINE component 212 receives an indication from OTT service 1102 indicating that the service provided to first UE device 1028a has ended. In one or more embodiments, the service may be ended either by the subscriber of OTT service 1102. In 1144, MINE component 212 sends a session termination request to PCRF 1006 indicating that the session between first UE device 1028a and OTT service 1102 has ended. In a particular embodiment, the session termination request message is sent using the Rx interface between MINE component 212 and PCRF 1006 using a session termination request (STR) message. In 1146, PCRF 1006 sends a session termination answer message acknowledging receipt of the session termination answer message. In a particular embodiment, the session termination answer message is sent using the Rx interface between MINE component 212 and PCRF 1006 using a session termination answer (STA) message.

In 1148, PCRF 1006 sends a restore default bearer request message to PCEF 1013 indicating that the modified bearer channel should be restored to the first (default) QoS level. In a particular embodiment, the restore default bearer request message is sent using the Gx interface between PCEF 1013 and PCRF 1006 using an RAR message. In 1150, PCEF 1013 restores the modified bearer channel to the first QoS level. In 1152, PCEF 1013 sends a restore default bearer answer message to PCRF 1006 indicating that the bearer channel has been restored to the first QoS level. In a particular embodiment, the restore default bearer answer message is sent using the Gx interface between PCRF 1006 and PCEF 1013 using an RAA message. First UE device 1028a may then utilize the restored bearer channel to continue communications.

Figure 12A:
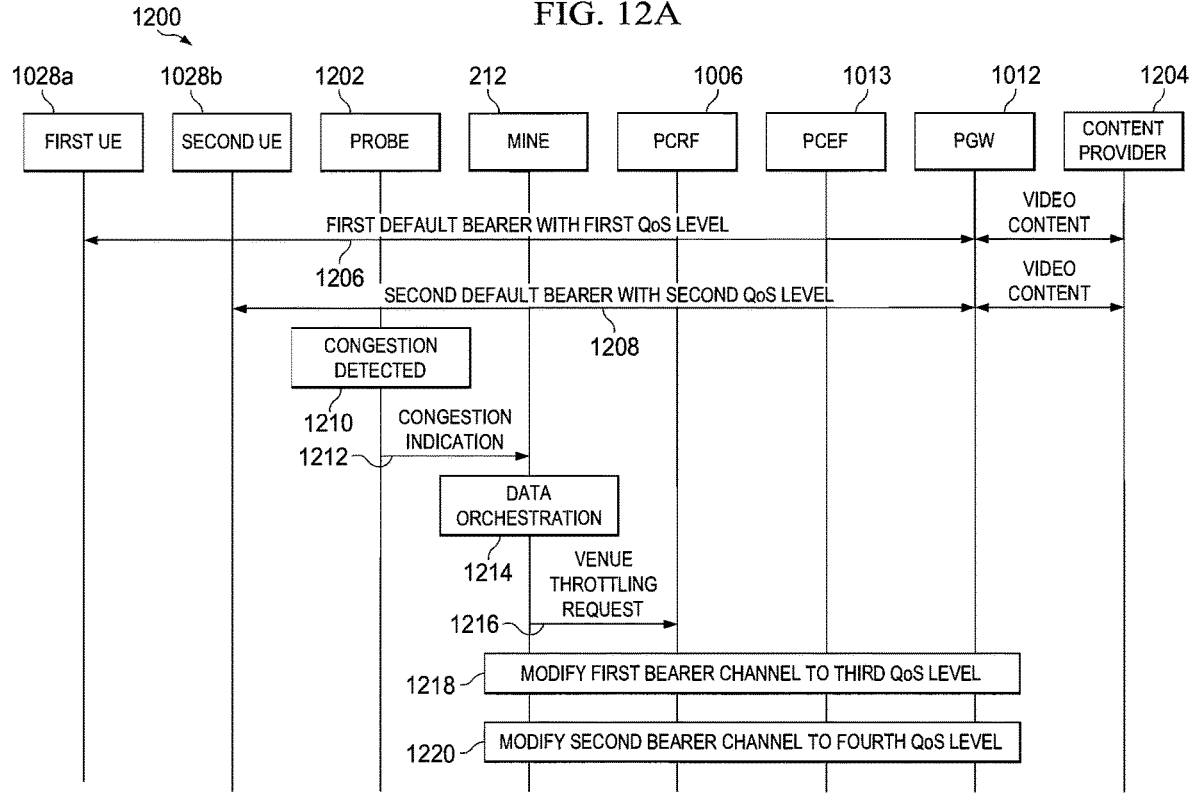
FIGS. 12A-12B are a simplified flow diagram showing an embodiment of signaling for venue throttling of a default bearer channel to provide dynamic quality of service (QoS) within communication system of FIG. 10.
Figure 12B:
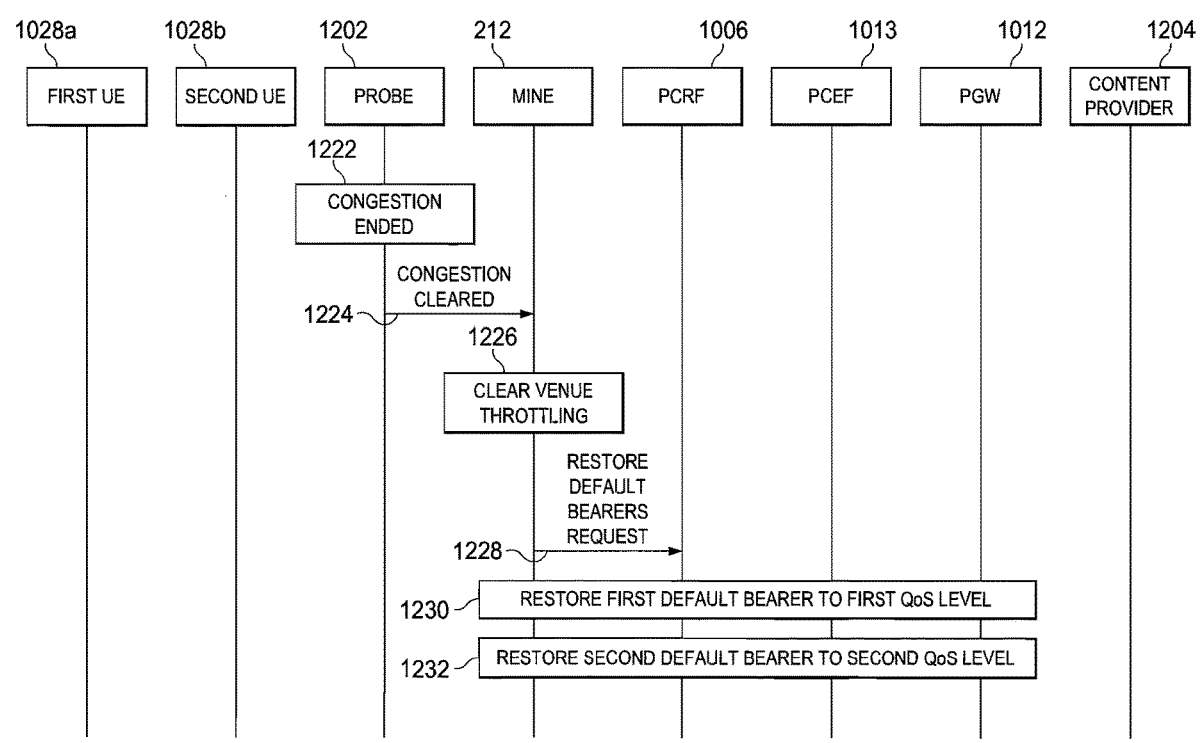

FIGS. 12A-12B are a simplified flow diagram 1200 showing an embodiment of signaling for venue throttling of a default bearer channel to provide dynamic quality of service (QoS) within communication system 1000 of FIG. 10. In the embodiment illustrated in FIG. 12, first user equipment device 1028a and second user equipment device 1028b are both located in an area served by first base station 1024. First user equipment device 1028a has established a first default bearer channel having a first QoS level with PGW 1012 to receive streaming video content from content provider 1024, and second user equipment device 1028b has established a second default bearer channel having a second QoS level with PGW 1012 to receive streaming video from content provider 1024. In the embodiment of FIG. 12, a network probe 1202 is configured to detect congestion within one or more sectors of LTE RAN 1020 and provide information indicative of the congestion within LTE RAN 1020 to MINE component 212. In one or more embodiments, when network probe 1202 detects that there is congestion within a sector, network probe 1202 sends the congestion information to MINE component 212. In particular embodiments, the congestion information may include a list of UEs within the congested sector. MINE component 212 may then perform data orchestration upon the congestion information and send an indication to PCRF 1006 indicating that the QoS level associated with one or more of the first bearer channel or the second bearer channel should be reduced to a lower QoS level in order to reduce congestion within the network. As a result, the video experience of one or more of first user equipment 1028a and second user equipment 1028b may be impacted.

In 1206, a first default bearer channel with a first QoS level is established between first UE device 1028a and PGW 1012 to receive video content from content provider 1204. In 1208, a second default bearer channel with a second QoS level is established between second UE device 1028b and PGW 1012 to receive video content from content provider 1204. In 1210, network probe 1202 detects that there is congestion in the sector within which first UE device 1028*a* and second UE device 1028*b* are located. In 1212, network probe 1202 sends a congestion indication to MINE component 1202 indicating that there is congestion in the sector and an identifiers associated with first UE device 1028*a* and second UE device 1028*b*. In a particular embodiment, the identifiers may include one or more of an IP address, an IMSI, an MSISDN, and an APN associated with each of first UE device 1028*a* and second UE device 1028*b*. In at least one embodiment, network probe 1202 may send the congestion indication on via an HTTP RESTful interface.

In 1214, receiving the congestion indication triggers MINE component 1214 to perform data orchestration on the congestion information received from network probe 1202 to determine that the respective QoS levels associated with the first default bearer channel and the second default bearer channels should be lowered to determined QoS levels. In 1216, MINE component 212 sends a venue-throttling request to PCRF 1006 indicating that the QoS levels associated with the first default bearer channel and the second default bearer channel are to be lowered. In 1218, PCRF instructs PCEF 1013 to modify the first bearer channel to a third QoS level lower than the first QoS level. As a result, the video experience received by a user of first UE device 1028*a* is impacted by experiencing a lower quality of service. In 1220, PCRF instructs PCEF 1013 to modify the second bearer channel to a fourth QoS level lower than the second QoS level. As a result, the video experience received by a user of second UE device 1028*b* is impacted by experiencing a lower quality of service. In one or more embodiments, the signaling used to modify the first bearer channel and the second bearer channel may be similar to that described with respect to FIGS. 11A-11C as described hereinabove.

In 1222, network probe 1202 determines that the congestion detected in the congested sector has ended. In 1224, network probe 1202 sends an indication that the congestion condition has cleared to MINE component 212. In 1226, MINE component 212 clears the venue throttling condition on the first bearer channel and the second bearer channel. In a particular embodiment, MINE component 212 may clear one or more venue throttling flags for the first bearer channel and the second bearer channel. In 1228, MINE component 212 sends a restore default bearers request to PCRF 1006 indicating that the first bearer channel and second bearer channel should be restored to their respective original QoS levels. In 1230, PCRF 1006 restores the first default bearer channel to the first QoS level. In 1232, PCRF 1006 restores the second default bearer to the second QoS level. In one or more embodiments, the signaling associated with restoring the first default bearer channel and the second default bearer channel is similar to that described with respect to FIG. 11D.

FIG. 13 is a simplified flow diagram 1300 showing another embodiment of signaling for venue throttling of a default bearer channel to provide dynamic quality of service (QoS) within communication system 1000 of FIG. 10. In the embodiment illustrated in FIG. 13, first user equipment device 1028*a* and second user equipment device 1028*b* are both located in a congested sector served by first base station 1024. In 1302, first user equipment device 1028*a* has a first default bearer channel with PGW 1012 modified to have a third QoS level from a higher first QoS level due to the congested condition. In 1304, second user equipment device 1028*b* has a second default bearer channel with PGW 1012 modified to have a fourth QoS level from a higher second QoS level due to the congestion. In 1306, first user equipment device 1028*a* moves out of the congestion sector. In 1308, network probe 1202 detects that first user equipment device 1028*a* has moved out of the congestion sector.

In 1310, network probe 1202 sends an indication to remove the first user equipment device 1028*a* from the congestion condition. In 1312, receiving the indication to remove first user equipment device 1028*a* from the congestion condition triggers MINE component 1214 to perform data orchestration on the updated congestion information received from network probe 1202 to determine that the QoS level for the first default bearer of first user equipment device 1028 should be modified with the first QoS level. In 1314, MINE component 212 sends an indication to PCRF 1006 to modify the first default bearer channel with the first QoS level. In 1316, PCRF 1006 modifies the first bearer channel with the first QoS level. In 1318, first user equipment device 1028*a* uses the first default bearer modified with the first QoS level to receive video content from content provider 1204.

Figure 14:
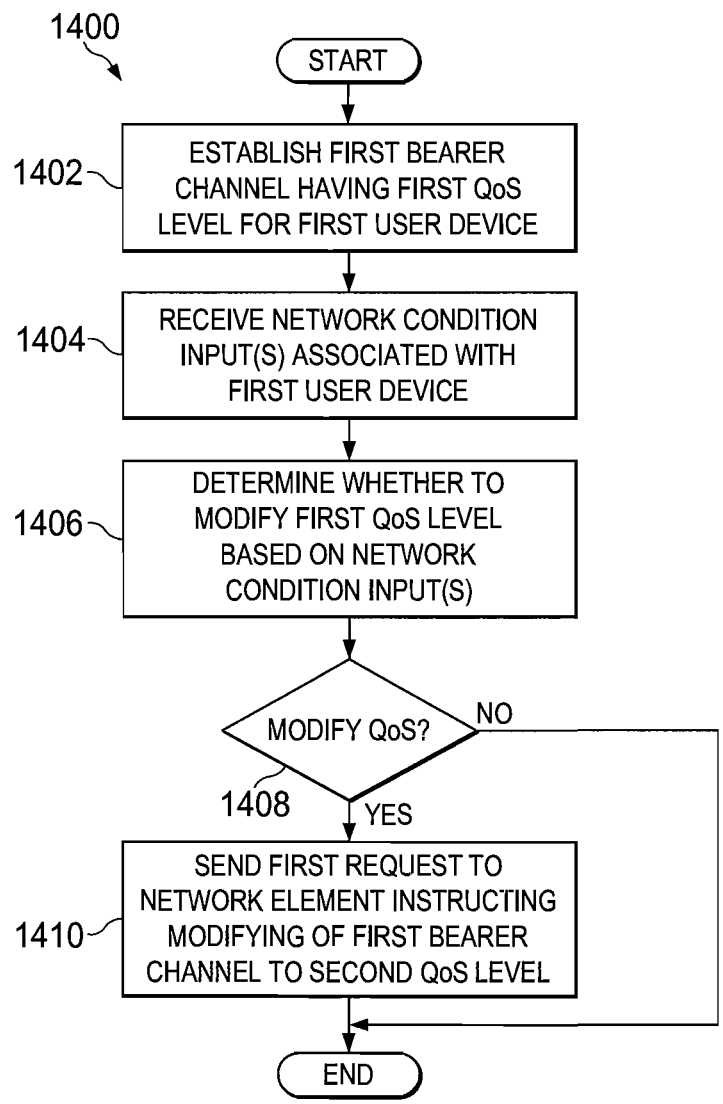
FIG. 14 is a simplified flowchart illustrating an embodiment of operations for modifying a default bearer channel to provide an updated quality of service (QoS).

FIG. 14 simplified flowchart 1400 illustrating an embodiment of operations for modifying a default bearer channel to provide an updated quality of service (QoS). In 1402, a first bearer channel is established between a first user device having a user associated therewith and a gateway. In at least one embodiments, the first user device is first user equipment device 1028*a* and the gateway is PGW 1012. In 1404, MINE component 212 receives at least one input indicating at least one network condition of a network associated with the first user device. In a particular embodiment, the network condition may include one or more of radio frequency (RF) conditions of the network, a bandwidth utilization by one or more user devices such as the first user device and/or application usage by one or more user devices. In 1406, MINE component 212 determines whether to modify the first quality of service level of the first bearer channel to a second quality of service level based upon the at least one input. In 1408, MINE component 212 determines whether a decision was made to modify the first quality of service level of the first bearer channel. If MINE component 212 determines that the first bearer channel will not be modified, the operations end. If MINE component 212 determines that the first bearer channel should be modified to the second quality of service level, in 1410 MINE component 212 sends a first request to a first network element instructing the first network element to modify the first bearer channel to the second quality of service level and the operations end. The first network element includes at least one policy associated with the user. In at least one embodiment, the first network element includes PCRF 1006 and the PCRF 1006 instructs PCEF 1013 to modify the first bearer channel to the second quality of service level.

In alternative embodiments, instead of the MINE component 212 determining whether to modify the first quality of service level of the first bearer channel to a second quality of service level and modifying the quality of service associated with the first bearer channel to the second quality of service level, MINE component 212 may be configured to send the first request to the first network element instructing the first network element to establish a second bearer channel between the first user device and the gateway, assign the second quality of service level to the second bearer channel, and move a flow associated with the first bearer channel to the second bearer channel while leaving the first bearer channel as-is.

In one implementation, server 201 includes software to achieve (or to foster) the operations as outlined herein in this Specification. Note that in one example, each of these elements can have an internal structure (e.g., a processor, a memory element, etc.) to facilitate some of the operations described herein. In other embodiments, the operations may be executed externally to these elements, or included in some other network element to achieve this intended functionality. Alternatively, server 201 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Note that in certain example implementations, the orchestration, work flow coordination, and translation functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 8] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 8) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, server 102 may include software in order to achieve the functions outlined herein. These activities can be facilitated by sub-modules of network, service, subscriber abstraction and orchestration module 202 (where sub-modules can be suitably combined in any appropriate manner, which may be based on particular configuration and/or provisioning needs). Server 201 can include memory elements for storing information to be used in achieving the data abstraction activities, as discussed herein. Additionally, server 201 may include a processor that can execute software or an algorithm to perform the operations, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication systems 100, 200, and 1000 (and their teachings) are readily scalable and can accommodate a large number of components, as well as more complicated/sophisticated arrangements and configurations. Accordingly, the examples provided should not limit the scope or inhibit the broad teachings of communication systems 100, 200, and 1000 as potentially applied to a myriad of other architectures.

It is also important to note that the steps in the preceding flow diagrams illustrate only some of the possible signaling scenarios and patterns that may be executed by, or within, communication systems 100, 200, and 1000. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100, 200, and 1000 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication systems 100, 200, and 1000 may be applicable to other protocols and arrangements. Moreover, the present disclosure is equally applicable to various technologies, aside from mobile architectures, as these have only been offered for purposes of discussion.

Additionally, although communication systems 100, 200, and 1000 have been illustrated with reference to particular elements and operations that facilitate the communication process, these elements and operations may be replaced by any suitable architecture or process that achieves the intended functionality of communication systems 100, 200, and 1000.

What is claimed is:

1. A method, comprising:
    translating, using a mobile IP enabler (MINE) component, a first identifier, used to identify a first user device in a network, to a second identifier, used by an enterprise network to identify a user associated with the user device;
    receiving, at the MINE component, a plurality of inputs indicating at least one condition of the network associated with the first user device, the first user device having a first bearer channel established between the first user device and a gateway, the first bearer channel having a first quality of service level,
        wherein the plurality of inputs includes a first input including information indicative of radio frequency conditions of the network, a second input including information indicative of bandwidth utilization of the first user device, and a third input including an identity of an application in use by the first user device;

determining, using the MINE component and based on the identity of an application in use by the first user device and a bandwidth characteristic of the identified application, to increase the quality of service level for the first user device;

generating, at the MINE component, a first request to modify the first user device from the first quality of service level to a second quality of service level, wherein the second quality of service level is an increase over the first quality of service level; and sending the first request from the MINE component to a first network element instructing the first network element to modify the first user device to the second quality of service level, wherein the first network element is configured to identify a subscriber policy associated with the first user device and to confirm that the subscriber policy authorizes the modification of the quality of service level.

2. The method of claim 1, wherein determining whether to modify the first user device to the second quality of service level includes determining whether to modify the first quality of service level of the first bearer channel to the second quality of service level based upon the received plurality of inputs, and wherein sending the first request to the first network element includes sending the first request to the first network element instructing the first network element to modify the first bearer channel to the second quality of service level.

3. The method of claim 2, further comprising:

receiving at least one fourth input indicating the at least one network condition associated with the first user device;

determining whether to modify the second quality of service level of the first bearer channel to the first quality of service level based upon the received at least one fourth input; and sending a second request to the first network element instructing the first network element to modify the first bearer channel to the first quality of service level.

4. The method of claim 1, wherein the first network element is configured to manage at least one policy associated with the user.

5. The method of claim 4, wherein the first network element includes a policy and charging rules function (PCRF) configured to manage the at least one policy.

6. The method of claim 1, wherein the at least one network condition includes a condition of a network in communication with the user device.

7. The method of claim 6, wherein the network condition includes an indication of congestion of a network path between the first user device and a service or application.

8. The method of claim 6, wherein the network includes a radio access network.

9. The method of claim 1, wherein the first identifier comprises an internet protocol (IP) address and wherein the second identifier does not comprise an IP address.

10. The method of claim 9, wherein the second identifier comprises a username.

11. Logic encoded in one or more non-transitory tangible media that includes code for execution, the code, when executed by a processor, operable to perform operations comprising:

translating, using a mobile IP enabler (MINE) component, a first identifier, used to identify a first user device in a network, to a second identifier, used by an enterprise network to identify a user associated with the user device;

receiving, at the MINE component, a plurality of inputs indicating at least one condition of the network associated with the first user device, the first user device having a first bearer channel established between the first user device and a gateway, the first bearer channel having a first quality of service level, wherein the plurality of inputs includes a first input including information indicative of radio frequency conditions of the network, a second input including information indicative of bandwidth utilization of the first user device, and a third input including an identity of an application in use by the first user device;

determining, using the MINE component and based on the identity of an application in use by the first user device and a bandwidth characteristic of the identified application, to increase the quality of service level for the first user device;

generating, at the MINE component, a first request to modify the first user device from the first quality of service level to a second quality of service level, wherein the second quality of service level is an increase over the first quality of service level; and sending the first request from the MINE component to a first network element instructing the first network element to modify the first user device to the second quality of service level, wherein the first network element is configured to identify a subscriber policy associated with the first user device and to confirm that the subscriber policy authorizes the modification of the quality of service level.

12. The media of claim 11, wherein determining whether to modify the first user device to the second quality of service level includes determining whether to modify the first quality of service level of the first bearer channel to the second quality of service level based upon the received plurality of inputs, and wherein sending the first request to the first network element includes sending the first request to the first network element instructing the first network element to modify the first bearer channel to the second quality of service level.

13. The media of claim 12, wherein the operations further comprise:

receiving at least one fourth input indicating the at least one network condition associated with the first user device;

determining whether to modify the second quality of service level of the first bearer channel to the first quality of service level based upon the received at least one fourth input; and sending a second request to the first network element instructing the first network element to modify the first bearer channel to the first quality of service level.

14. The media of claim 11, wherein the first network element includes a policy and charging rules function (PCRF) configured to manage at least one policy associated with the user.

15. The media of claim 11, wherein the at least one network condition includes a condition of a network in communication with the user device.

16. The media of claim 15, wherein the network condition includes an indication of congestion of a network path between the first user device and a service or application.

17. The media of claim 15, wherein the network includes a radio access network.

18. An apparatus, comprising:
a memory element configured to store data,
a processor operable to execute instructions associated with the data, and
at least one module, the at least one module being configured to:
  translate, using a mobile IP enabler (MINE) component, a first identifier, used to identify a first user device in a network, to a second identifier, used by an enterprise network to identify a user associated with the user device;
  receive, at the MINE component, a plurality of inputs indicating at least one condition of the network associated with the first user device, the first user device having a first bearer channel established between the first user device and a gateway, the first bearer channel having a first quality of service level, wherein the plurality of inputs includes a first input including information indicative of radio frequency conditions of the network, a second input including information indicative of bandwidth utilization of the first user device, and a third input including an identity of an application in use by the first user device;
  determine, using the MINE component and based on the identity of an application in use by the first user device and a bandwidth characteristic of the identified application, to increase the quality of service level for the first user device;
  generate, at the MINE component, a first request to modify the first user device from the first quality of service level to a second quality of service level, wherein the second quality of service level is an increase over the first quality of service level; and
  send the first request from the MINE component to a first network element instructing the first network element to modify the first user device to the second quality of service level, wherein the first network element is configured to identify a subscriber policy associated with the first user device and to confirm that the subscriber policy authorizes the modification of the quality of service level.

19. The apparatus of claim 18, wherein determining whether to modify the first user device to the second quality of service level includes determining whether to modify the first quality of service level of the first bearer channel to the second quality of service level based upon the received plurality of inputs, and
wherein sending the first request to the first network element includes sending the first request to the first network element instructing the first network element to modify the first bearer channel to the second quality of service level.

20. The apparatus of claim 19, wherein the at least one module is further configured to:
receive at least one fourth input indicating the at least one network condition associated with the first user device;
determine whether to modify the second quality of service level of the first bearer channel to the first quality of service level based upon the received at least one fourth input; and
send a second request to the first network element instructing the first network element to modify the first bearer channel to the first quality of service level.

21. The apparatus of claim 18, wherein the first network element includes a policy and charging rules function (PCRF) configured to manage at least one policy associated with the user.

22. The apparatus of claim 18, wherein the at least one network condition includes a condition of a network in communication with the first user device.

23. The apparatus of claim 22, wherein the network condition includes an indication of congestion of the network.

24. The apparatus of claim 22, wherein the network includes a radio access network.

* * * * *